(12) United States Patent
Awad et al.

(10) Patent No.: US 10,681,658 B2
(45) Date of Patent: *Jun. 9, 2020

(54) COMMUNICATION SYSTEM

(71) Applicant: NEC Corporation, Minato-ku, Tokyo (JP)

(72) Inventors: Yassin Aden Awad, Uxbridge (GB); Kay Seo, Guildford (GB)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,565

(22) Filed: Jul. 5, 2017

(65) Prior Publication Data

US 2017/0303226 A1    Oct. 19, 2017

Related U.S. Application Data

(63) Continuation of application No. 14/787,914, filed as application No. PCT/JP2014/062417 on Apr. 30, 2014, now Pat. No. 9,749,976.

(30) Foreign Application Priority Data

May 7, 2013    (GB) .................................. 1308196.3

(51) Int. Cl.
  *H04W 56/00*    (2009.01)
  *H04B 7/26*    (2006.01)
  *H04W 72/04*    (2009.01)

(52) U.S. Cl.
  CPC ...... *H04W 56/0015* (2013.01); *H04B 7/2656* (2013.01); *H04W 72/0446* (2013.01)

(58) Field of Classification Search
  None
  See application file for complete search history.

(56) References Cited

U.S. PATENT DOCUMENTS 9,313,700 B2    4/2016  Pu ..................... H04W 36/0083
9,479,216 B2    10/2016  Li .......................... H04B 1/709
(Continued)

FOREIGN PATENT DOCUMENTS

CN    101690340 A    3/2010
CN    102132610 A    7/2011
(Continued)

OTHER PUBLICATIONS

Chinese Office Action for CN Application No. 201480026061.3 dated Feb. 6, 2018 with English Translation.
(Continued)

*Primary Examiner* — Andrew C Oh

(57) ABSTRACT

Communication apparatus is disclosed which is suitable for communicating with a mobile communication device in a communication system which uses a plurality of radio frames wherein each radio frame is subdivided in the time domain into a plurality of subframes, each subframe is subdivided in the time domain into a plurality of slots, and each slot is subdivided in the time domain into a plurality of symbols. The communication apparatus operates a communication cell, generates discovery signals, for use in a cell search procedure, each discovery signal comprising a pair of synchronisation signals and a further signal, and transmits each synchronisation signal and the further signal in a respective symbol of a radio frame. The symbol in which the further signal is transmitted separated, in the time domain, by no more than half a radio frame from at least one of said pair of synchronisation signals.

8 Claims, 19 Drawing Sheets

(56) References Cited

U.S. PATENT DOCUMENTS

| | | | |
|---|---|---|---|
| 9,491,755 B2 | 11/2016 | Abu-Surra | H04W 56/00 |
| 9,526,100 B2 | 12/2016 | Kim | H04W 72/0446 |
| 9,749,976 B2* | 8/2017 | Awad | H04W 56/0015 |
| 2008/0019350 A1 | 1/2008 | Onggosanusi | H04J 11/069 370/350 |
| 2008/0151839 A1 | 6/2008 | Litwin | H04B 1/70735 370/336 |
| 2009/0116470 A1 | 5/2009 | Berggren | H03M 13/33 370/342 |
| 2009/0135803 A1 | 5/2009 | Luo et al. | |
| 2009/0219883 A1 | 9/2009 | Cho | H04J 11/0069 370/330 |
| 2010/0069056 A1 | 3/2010 | Shen | H04J 11/0093 455/434 |
| 2010/0069066 A1 | 3/2010 | Shen | H04J 11/0093 455/434 |
| 2010/0135257 A1 | 6/2010 | Higuchi et al. | |
| 2010/0309836 A1 | 12/2010 | Sugawara | H04W 72/1231 370/312 |
| 2011/0013592 A1 | 1/2011 | Uemura | H04W 24/10 370/331 |
| 2011/0076960 A1 | 3/2011 | Yun | H04W 24/10 455/67.14 |
| 2011/0103350 A1 | 5/2011 | Lindoff | |
| 2011/0129008 A1 | 6/2011 | Chmiel et al. | |
| 2011/0206032 A1 | 8/2011 | Uemura | H04J 11/0069 370/350 |
| 2011/0235743 A1 | 9/2011 | Lee | H04L 5/0048 375/295 |
| 2011/0274072 A1 | 11/2011 | Michel | H04W 52/243 370/329 |
| 2012/0076084 A1 | 3/2012 | Iwamura | H04W 72/0426 370/329 |
| 2012/0087273 A1 | 4/2012 | Koo | H04B 7/024 370/252 |
| 2012/0100880 A1 | 4/2012 | Baek | H04W 48/16 455/515 |
| 2012/0157153 A1 | 6/2012 | Song | H04W 52/0245 455/522 |
| 2012/0163198 A1* | 6/2012 | Chin | H04W 36/0088 370/252 |
| 2012/0163307 A1 | 6/2012 | Wang | H04W 72/1215 370/329 |
| 2012/0172041 A1* | 7/2012 | Krishnamurthy | H04J 11/005 455/436 |
| 2012/0182909 A1 | 7/2012 | Yamamoto | H04W 56/002 370/281 |
| 2013/0003584 A1 | 1/2013 | Alriksson | H03G 3/3052 370/252 |
| 2013/0016630 A1* | 1/2013 | Bhushan | H04W 48/12 370/255 |
| 2013/0021929 A1 | 1/2013 | Kim | H04B 7/024 370/252 |
| 2013/0058234 A1 | 3/2013 | Yang et al. | |
| 2013/0083744 A1 | 4/2013 | Peng | H04W 52/04 370/329 |
| 2013/0084870 A1 | 4/2013 | Nylander | H04W 36/0061 455/436 |
| 2013/0121246 A1 | 5/2013 | Guey | H04W 56/001 370/328 |
| 2013/0182630 A1 | 7/2013 | Yamamoto | H04J 11/0073 370/312 |
| 2013/0183908 A1 | 7/2013 | Jung | H04W 24/10 455/67.11 |
| 2013/0223416 A1 | 8/2013 | Michel | H04W 16/14 370/336 |
| 2013/0225192 A1 | 8/2013 | Yamamoto | H04W 16/16 455/452.1 |
| 2013/0250923 A1 | 9/2013 | Koorapaty | H04L 5/0007 370/336 |
| 2013/0267221 A1* | 10/2013 | Srinivasan | H04W 36/0088 455/422.1 |
| 2013/0286965 A1* | 10/2013 | Xu | H04W 16/26 370/329 |
| 2013/0288687 A1 | 10/2013 | Morioka | H04W 36/08 455/437 |
| 2014/0078912 A1 | 3/2014 | Park | H04L 5/0048 370/252 |
| 2014/0078980 A1* | 3/2014 | Frenne | H04W 72/042 370/329 |
| 2014/0086162 A1 | 3/2014 | Rimini | H04B 1/10 370/329 |
| 2014/0092758 A1* | 4/2014 | Suzuki | H04W 48/18 370/252 |
| 2014/0153545 A1 | 6/2014 | Dimou | H04W 36/30 370/332 |
| 2014/0226519 A1 | 8/2014 | Nagata et al. | |
| 2014/0254452 A1 | 9/2014 | Golitschek Edler Von Elbwart | H04W 52/0216 370/311 |
| 2014/0314072 A1 | 10/2014 | Awad | H04W 56/0015 370/350 |
| 2014/0334416 A1 | 11/2014 | Ko | H04L 5/0053 370/329 |
| 2015/0003348 A1* | 1/2015 | Ishii | H04L 5/001 370/329 |
| 2015/0009898 A1* | 1/2015 | Rosa | H04L 5/0048 370/328 |
| 2015/0016339 A1* | 1/2015 | You | H04J 11/0073 370/328 |
| 2015/0036609 A1 | 2/2015 | Kim | H04W 56/00 370/329 |
| 2015/0223219 A1 | 8/2015 | Nagata et al. | |
| 2015/0304932 A1* | 10/2015 | Wei | H04J 11/0069 370/331 |
| 2015/0351063 A1 | 12/2015 | Charbit | H04L 5/0051 370/329 |
| 2016/0044706 A1 | 2/2016 | Yang | H04L 5/005 370/329 |

FOREIGN PATENT DOCUMENTS

| | | | |
|---|---|---|---|
| CN | 102598777 A | 7/2012 | |
| EP | 2152016 | 4/2008 | H04Q 7/20 |
| EP | 2152016 A1 | 2/2010 | |
| EP | 2400805 A2 | 12/2011 | |
| JP | 2009-027676 A | 2/2009 | |
| JP | 2010-537509 A | 12/2010 | |
| JP | 2014-030131 A | 2/2014 | |
| WO | 2009/023792 A1 | 2/2009 | |
| WO | 2013/022512 A1 | 2/2013 | |
| WO | 2013/040487 A1 | 3/2013 | |
| WO | 2013/054683 A1 | 4/2013 | |
| WO | 2013/081293 A1 | 6/2013 | |

OTHER PUBLICATIONS

3rd Generation Partnership Project; Technical Specification Group Radio Access Network; "Consideration on efficient discovery of small cell", Fujitsu, 3GPP TSG RAN WG1 Meeting #72bis, R1-131100, Chicago, US, Apr. 15-19, 2013, pp. 1-3.

3rd Generation Partnership Project; Technical Specification Group Radio Access Network; "Discussion on small cell discovery issues", Panasonic, 3GPP TSG RAN WG1 Meeting #72bis, R1-131330, Chicago, USA, Apr. 15-19, 2013, pp. 1-5.

3rd Generation Partnership Project; Technical Specification Group Radio Access Network; "Background search for small cell detection", Nokia Siemens Networks, Nokia Corporation, NTT DOCOMO, Inc., 3GPP TSG-RAN WG2 Meeting #78, R2-123102, Prague, Czech Republic, May 21-25, 2012, pp. 1-11.

Japanese Office Action for JP Application No. 2016-509872 dated Nov. 1, 2016 with English Translation.

International Search Report for PCT Application No. PCT/JP2014/062417, dated Jan. 14, 2015.

3rd Generation Partnership Project; Technical Specification Group Radio Access Network; Scenarios and requirements for small cell

(56) References Cited

OTHER PUBLICATIONS enhancements for E-UTRA and E-UTRAN, 3GPP TR 36.932 V12.1.0, Mar. 2013. Cited in the Specification.
3rd Generation Partnership Project; Technical Specification Group Radio Access Network; Evolved Universal Terrestrial Radio Access (E-UTRA); Physical Channels and Modulation (Release 10), 3GPP TS 36.211 V10.2.0, Jun. 2011. Cited in the Specification.
3GPP TS 36.331 v 11.3.0 (Mar. 2013).
Huawei, Hisilicon, "Efficient discovery of small cells and the configurations", 3GPP TSG RAN WG1 Meeting #72bis, Apr. 2013, R1-130895, Agenda Item: 7.2.5.3.2, Chicago, USA, cited in JPOA.
Huawei, Hisilicon, "RRM measurements for NCT", 3GPP TSG RAN WG1 Meeting #72bis, Apr. 2013, R1-131158, Agenda Item: 7.2.1.3, Chicago, USA, cited in JPOA.
NTT DOCOMO, "Views on Enhanced Small Cell Discovery", 3GPP TSG RAN WG1 Meeting #72bis, Apr. 2013, R1-131425, Agenda Item: 7.2.5.3.2, Chicago, USA, cited in JPOA.
Japanese Office Action for JP Application No. 2017-099527 dated Jun. 20, 2018 with English Translation.

\* cited by examiner

COMMUNICATION SYSTEM

CROSS-REFERENCE TO RELATED APPLICATIONS

The present application is a continuation application of U.S. patent application Ser. No. 14/787,914 filed on Oct. 29, 2015, which is a National Stage Entry of International Application PCT/JP2014/062417, filed on Apr. 30, 2014, which claims the benefit of priority from United Kingdom patent application No. 1308196.3, filed on May 7, 2013, the disclosures of all of which are incorporated herein, in their entirety, by this reference.

TECHNICAL FIELD

The present invention relates to mobile communications devices and networks, particularly but not exclusively those operating according to the $3^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)).

BACKGROUND ART

In 3GPP LTE networks, a base station (i.e. evolved NodeB, eNB) of a Radio Access Network (RAN) transmits data and signalling between a core network (CN) and User Equipment (UEs) located within the base station's coverage area.

Developments in communication networks have seen increased deployment of so called 'small' cells operated by Low Power Nodes (LPNs), such as pico eNBs, femto cells, Home eNBs (HeNBs) or the like, which cells have a smaller coverage area than existing macro cells operated by a higher power macro base station. Networks comprising a number of different cell types, for example a network comprising a macro cell and a femto cell, are referred to as Heterogeneous Networks, or HetNets.

More recently the need to make further enhancements to small cells using low-power nodes, has been identified as one of the most important topics for further development of 3GPP standards compliant communication systems in order to enable such communication systems to cope with increases in mobile traffic especially for hotspot deployments in indoor and outdoor scenarios. According to this interest in small cell enhancements, scenarios and requirements for small cell enhancements were studied and captured in a 3GPP technical report (3GPP TR 36.932) the contents of which are herein incorporated by reference. TR 36.932 defines a low-power node as generally meaning a node whose transmit power is lower than that of macro node and base station classes. For example, as indicated above, both pico eNB and femto HeNBs are considered to be low power nodes.

Currently, the average geographic density of macro cells is 5-7 macro cells per square kilometre. However, it is predicted that the number of small cells in urban areas will reach 40 small cells per square kilometre. The increasing geographic density of small cells presents challenges in achieving successful and efficient handover procedures in HetNets. In a densely deployed small cell scenario for example, the number of small cells a piece of user equipment (UE) such as a mobile ('cellular') telephone or other similar mobile device should detect and measure for the purposes of mobility management (e.g. management of the smooth transfer from one cell to another) can be much larger than that of other macro cell or less dense HetNet scenarios.

Accordingly whilst, in the conventional LTE systems up to the latest Release 11, the use of Synchronisation Channels (SCH) which consist of a Primary Synchronisation Channel (P-SCH) and a Secondary Synchronisation Channel (S-SCH) can be used to help the UE to search, acquire, and synchronise with an eNB, it is generally accepted that the SCHs will be unable to cope with such a densely populated cell deployment scenario. Specifically, there are a number of other issues that need to be considered for a densely populated small cell environment including, for example: how to ensure efficient use of power; the speed of the search for/discovery of a small cell; the ability to identify the cells; and/or the ability to acquire measurement results for the purposes of handover.

SUMMARY OF INVENTION

Accordingly, preferred embodiments of the present invention aim to provide methods and apparatus which overcome or at least alleviate one or more of the above issues.

In one aspect of the invention there is provided communication apparatus for communicating with a mobile communication device in a communication system which uses a plurality of radio frames wherein each radio frame is subdivided in the time domain into a plurality of subframes, each subframe is subdivided in the time domain into a plurality of slots, and each slot is subdivided in the time domain into a plurality of symbols, said communication apparatus comprising: cell operating means for operating a communication cell; discovery signal generating means for generating discovery signals, for use in a cell search procedure, each discovery signal comprising a pair of synchronisation signals and at least one further signal; and transmitting means for transmitting each of said pair of synchronisation signals and said at least one further signal in a respective symbol of a radio frame; wherein said symbol in which said at least one further signal is transmitted separated, in the time domain, by no more than half a radio frame from at least one of said pair of synchronisation signals.

The transmitting means may be operable to transmit said at least one further signal in a different subframe to said pair of synchronisation signals.

The at least one further signal may comprise a plurality of further signals and wherein said transmitting means may be operable to transmit each of said plurality of further signals in a different respective subframe.

The transmitting means may be operable to transmit said at least one further signal in the same subframe as said pair of synchronisation signals.

The transmitting means may be operable to transmit said at least one further signal in a different slot to said pair of synchronisation signals.

The transmitting means may be operable to transmit said at least one further signal at a separation, in the time domain, of a single slot from one of said pair of synchronisation signals.

The transmitting means may be operable to transmit the, or at least one, further signal in a symbol that is adjacent, in the time domain, to the symbol in which one of said pair of synchronisation signals is transmitted.

The at least one further signal may comprise a plurality of further signals and wherein said transmitting means may be operable to transmit each of said plurality of further signals in a symbol that is adjacent at least one other symbol in which one of said plurality of further signals is transmitted.

The pair of synchronisation signals may comprise at least one of a primary synchronisation signal (PSS) and a secondary synchronisation signal (SSS).

The pair of synchronisation signals may comprise a primary synchronisation signal (PSS) and a secondary synchronisation signal (SSS).

The at least one further signal may comprise at least one of a primary synchronisation signal (PSS) and a secondary synchronisation signal (SSS).

The at least one further signal may comprise a primary synchronisation signal (PSS) and a secondary synchronisation signal (SSS).

The at least one further signal may comprise at least one signal that is different to a primary synchronisation signal (PSS) and/or a secondary synchronisation signal (SSS).

The cell operating means may be operable to operate said cell as one cell of a cluster of cells each cell of which shares a common cell identifier (or 'cluster identifier'); said discovery signal generating means is operable to encode an identifier for said one cell into at least one of said pair of synchronisation signals and said at least one further signal; and wherein said identifier for said one cell is unique at least within said cluster of cells.

The discovery signal generating means may be operable to encode said common cell identifier (or 'cluster identifier') into at least one of said pair of synchronisation signals and said identifier for said one cell into said at least one further signal.

The discovery signal generating means may be operable to encode said common cell identifier (or 'cluster identifier') into said pair of synchronisation signals by encoding a cell group identifier into a first of said pair of synchronisation signals and a physical layer cell identity (PCI), identifying the cell within a cell group represented by the cell group identifier, into a second of said pair of synchronisation signals.

The identifier for said one cell, said cell group identifier, and said PCI together may provide a global identifier for said one cell.

The discovery signal generating means may be operable to encode said identifier for said one cell, as a global identifier for said one cell that does not depend on the common cell identifier, into at least one of said pair of synchronisation signals and said at least one further signal.

Each of said radio frame may be divided, in the frequency domain into a plurality of resource blocks, each resource block being divided, in the frequency domain, into a plurality of sub-carriers, wherein at least one of said pair of synchronisation signals and said at least one further signal may extend across more than six resource blocks in the frequency domain.

The at least one of said pair of synchronisation signals and said at least one further signal may extend into at least twelve resource blocks in the frequency domain.

According to another aspect of the invention there is provided a communication apparatus for communicating with a mobile communication device in a communication system which uses a plurality of radio frames wherein each radio frame is subdivided in the time domain into a plurality of subframes, each subframe is subdivided in the time domain into a plurality of slots, and each slot is subdivided in the time domain into a plurality of symbols, said communication apparatus comprising: means for operating a communication cell as one cell of a cluster of cells each cell of which shares a common cell group identifier, and a common physical cell identity (PCI), which cell group identifier and common PCI together form a shared common cell identifier (or 'cluster identifier'); discovery signal generating means for generating discovery signals, for use in a cell search procedure, each discovery signal comprising at least a pair of synchronisation signals and encoding an identifier for said one cell, wherein said identifier for said one cell is unique at least within said cluster of cells; and means for transmitting each of said pair of synchronisation signals in a respective symbol of a radio frame.

The discovery signal generating means may be operable to encode said shared common cell identifier (or 'cluster identifier') into at least one of said pair of synchronisation signals and said identifier for said one cell into at least one further signal forming part of said discovery signal.

The discovery signal generating means may be operable to encode said shared common cell identifier (or 'cluster identifier') into said pair of synchronisation signals by encoding a cell group identifier into a first of said pair of synchronisation signals and a physical layer cell identity (PCI), identifying the cell within a cell group represented by the cell group identifier, into a second of said pair of synchronisation signals.

The identifier for said one cell, said cell group identifier, and said PCI together may provide a global identifier for said one cell.

The discovery signal generating means may be operable to encode said identifier for said one cell, as a global identifier for said one cell that does not depend on the common cell identifier, into said discovery signal.

Communication apparatus for communicating with a mobile communication device in a communication system which uses a plurality of radio frames wherein each radio frame is subdivided in the time domain into a plurality of subframes, said communication apparatus comprising: means for operating a communication cell; means for generating discovery signals for use in a cell search procedure, each discovery signal comprising at least one synchronisation signal; configuring means for configuring a periodicity at which said communication apparatus should transmit said discovery signals wherein said configuring means is operable, when configuring said periodicity, to select said periodicity from any of a plurality of possible periodicities; and means for transmitting said discovery signals at said configured periodicity.

The configuring means may be operable to configure a periodicity comprising a plurality of radio frames.

The configuring means may be operable to configure a periodicity comprising a plurality of subframes.

The configuring means may be operable, when configuring said periodicity, to select said periodicity from a range of possible periodicities.

The range of possible periodicities may extend beyond 50 radio frames (or 50 subframes).

According to one aspect of the invention there is provided a mobile communication device for communicating with communication apparatus in a cellular communication system using a plurality of radio frames wherein each radio frame is subdivided in the time domain into a plurality of subframes, each subframe is subdivided in the time domain into a plurality of slots, and each slot is subdivided in the time domain into a plurality of symbols, said mobile communication device comprising: means for performing a cell search procedure to discover a communication cell controlled by said communication apparatus; means for receiving a discovery signal as part of said cell search procedure, wherein said discovery signal comprises a pair of synchronisation signals and at least one further signal, and wherein a symbol in which said at least one further signal is transmitted is separated, in the time domain, by no more than half a radio frame from at least one of said pair of synchronisation signals; and means for identifying, and synchronising with, said cell based on said pair of synchronisation signals and said at least one further signal in said discovery signal.

The mobile communication device may comprise means for performing frequency estimation based on said pair of synchronisation signals and at least one further signal in said discovery signal.

According to another aspect of the invention a mobile communication device for communicating with communication apparatus in a cellular communication system using a plurality of radio frames wherein each radio frame is subdivided in the time domain into a plurality of subframes, each subframe is subdivided in the time domain into a plurality of slots, and each slot is subdivided in the time domain into a plurality of symbols, said mobile communication device comprising: means for performing a cell search procedure to discover a communication cell, controlled by said communication apparatus, as one cell of a cluster of cells each cell of which shares a common cell group identifier, and a common physical cell identity (PCI), which cell group identifier and common PCI together form a shared common cell identifier (or 'cluster identifier'); means for receiving a discovery signal as part of said cell search procedure, wherein said discovery signal comprises at least a pair of synchronisation signals and encoding an identifier for said one cell, wherein said identifier for said one cell is unique at least within said cluster of cells; and means for identifying said cell by extracting said identifier for said one cell from said discovery signal and for synchronising with said one cell based on said pair of synchronisation signals.

According to another aspect of the invention there is provided a communication system comprising at least one communication apparatus and at least one mobile communication device each according to one of the associated aspects disclosed herein.

According to another aspect of the invention there is provided a computer program product which may comprise instructions operable to program a programmable processor to implement communication apparatus or a communication device.

According to another aspect of the invention there is provided a method performed by communication apparatus for communicating in a communication system which uses a plurality of radio frames wherein each radio frame is subdivided in the time domain into a plurality of subframes, each subframe is subdivided in the time domain into a plurality of slots, and each slot is subdivided in the time domain into a plurality of symbols, said method comprising: operating a communication cell; generating discovery signals, for use in a cell search procedure, each discovery signal comprising a pair of synchronisation signals and at least one further signal; and transmitting each of said pair of synchronisation signals and said at least one further signal in a respective symbol of a radio frame; wherein said symbol in which said at least one further signal is transmitted separated, in the time domain, by no more than half a radio frame from at least one of said pair of synchronisation signals.

According to another aspect of the invention there is provided a method performed by communication apparatus for communicating in a communication system which uses a plurality of radio frames wherein each radio frame is subdivided in the time domain into a plurality of subframes, each subframe is subdivided in the time domain into a plurality of slots, and each slot is subdivided in the time domain into a plurality of symbols, said method comprising: operating a communication cell as one cell of a cluster of cells each cell of which shares a common cell group identifier, and a common physical cell identity (PCI), which cell group identifier and common PCI together form a shared common cell identifier (or 'cluster identifier'); generating discovery signals, for use in a cell search procedure, each discovery signal comprising at least a pair of synchronisation signals and encoding an identifier for said one cell, wherein said identifier for said one cell is unique at least within said cluster of cells; and transmitting each of said pair of synchronisation signals in a respective symbol of a radio frame.

According to another aspect of the invention there is provided a method performed by communication apparatus for communicating in a communication system which uses a plurality of radio frames wherein each radio frame is subdivided in the time domain into a plurality of subframes, said method comprising: operating a communication cell; generating discovery signals for use in a cell search procedure, each discovery signal comprising at least one synchronisation signal; configuring a periodicity at which said communication apparatus should transmit said discovery signals wherein, when configuring said periodicity, said periodicity is selected from a plurality of possible periodicities; and transmitting said discovery signals at said configured periodicity.

According to another aspect of the invention there is provided a method performed by a mobile communication device for communicating with communication apparatus in a communication system which uses a plurality of radio frames wherein each radio frame is subdivided in the time domain into a plurality of subframes, each subframe is subdivided in the time domain into a plurality of slots, and each slot is subdivided in the time domain into a plurality of symbols, said method comprising: performing a cell search procedure to discover a communication cell controlled by said communication apparatus; receiving a discovery signal as part of said cell search procedure, wherein said discovery signal comprises a pair of synchronisation signals and at least one further signal, and wherein a symbol in which said at least one further signal is transmitted is separated, in the time domain, by no more than half a radio frame from at least one of said pair of synchronisation signals; and identifying, and synchronising with, said cell based on said pair of synchronisation signals and at least one further signal in said discovery signal.

According to another aspect of the invention there is provided a method performed by a mobile communication device for communicating with communication apparatus in a communication system which uses a plurality of radio frames wherein each radio frame is subdivided in the time domain into a plurality of subframes, each subframe is subdivided in the time domain into a plurality of slots, and each slot is subdivided in the time domain into a plurality of symbols, said method comprising: performing a cell search procedure to discover a communication cell, controlled by said communication apparatus, as one cell of a cluster of cells each cell of which shares a common cell group identifier, and a common physical cell identity (PCI), which cell group identifier and common PCI together form a shared common cell identifier (or 'cluster identifier'); receiving a discovery signal as part of said cell search procedure, wherein said discovery signal comprises at least a pair of synchronisation signals and encoding an identifier for said one cell, wherein said identifier for said one cell is unique at least within said cluster of cells; and identifying said cell by extracting said identifier for said one cell from said discovery signal and for synchronising with said one cell based on said pair of synchronisation signals.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which.

MODE FOR CARRYING OUT THE INVENTION

Overview

Figure 1:
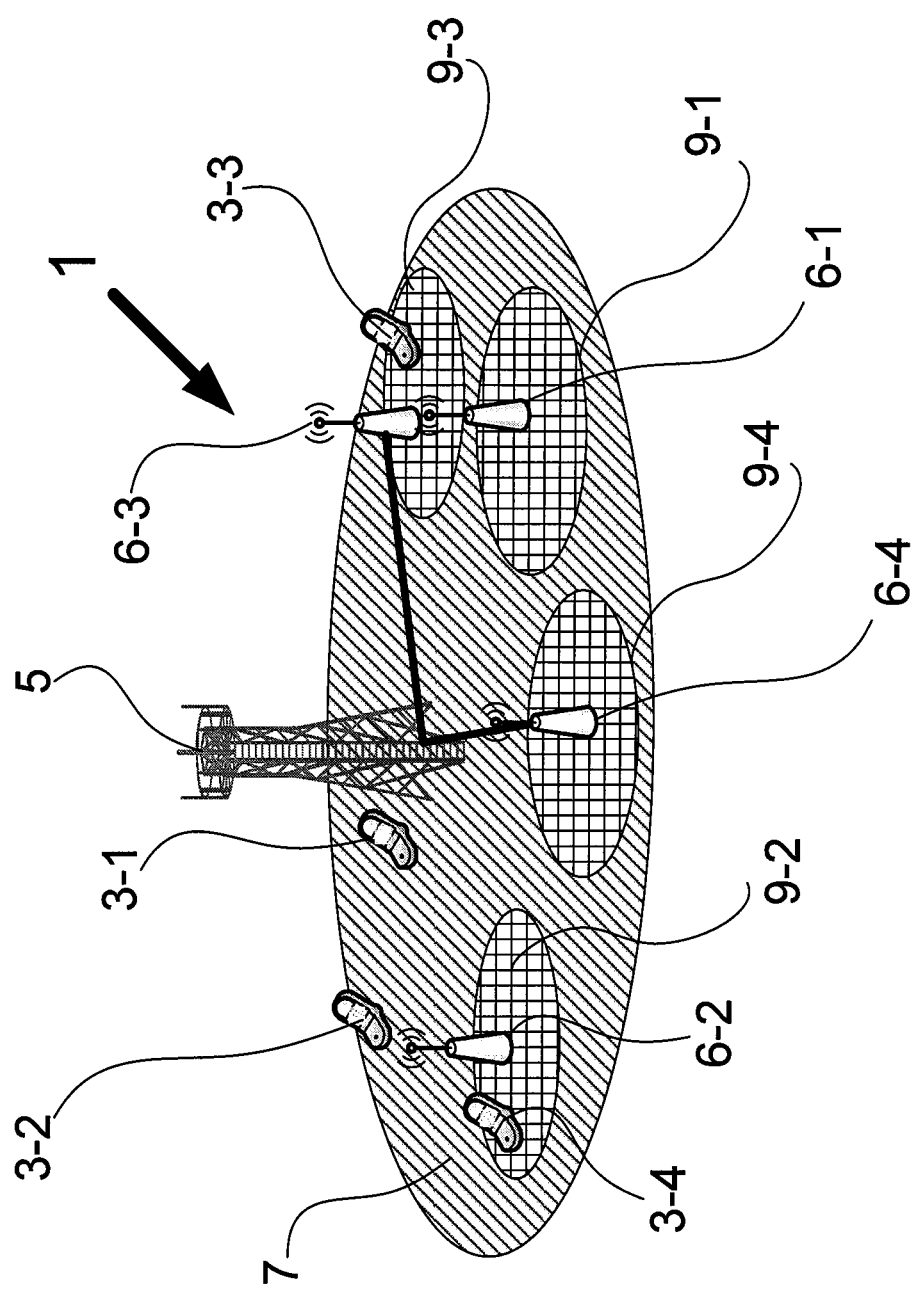
FIG. 1 schematically illustrates a telecommunication system.

FIG. 1 schematically illustrates a mobile (cellular) telecommunication system 1 in which a user of any of a plurality of mobile communication devices 3-1, 3-2, 3-3, 3-4, can communicate with other users via one or more of a plurality of base stations 5, 6-1, 6-2, 6-3, 6-4. In the system illustrated in FIG. 1, each base station 5, 6 shown is an Evolved Universal Terrestrial Radio Access Network (E-UTRAN) base station capable of operating in a multi-carrier environment.

In FIG. 1, the base station labelled 5 comprises a so called 'macro' base station operating a relatively large 'macro' cell 7. The other base stations 6 shown in FIG. 1, each comprises a so called small cell base station (possibly a so called 'pico' base station, 'Remote Radio Head (RRH)', or other similar device capable of operating a small cell) operating a respective small cell 9-1, 9-2, 9-3, 9-4.

The power used to provide small cells 9 is low relative to the power used for the macro cell 7 and the small cells 9 are therefore small relative to the macro cell 7. As shown in FIG. 1, in this example the geographical coverage of each of the small cells 9 falls completely within the geographical coverage of the macro cell 7 although partially overlapping geographical coverage with the macro cell 7 is, of course, possible.

The macro base station 5 is configured to provide discovery signals in each radio frame to allow a mobile communication device 3 to discover, and achieve synchronisation with, the macro base station 5. Specifically, the macro base station 5 transmits a discovery signal comprising a primary synchronisation signal (PSS) in a primary synchronisation channel (P-SCH) and a secondary synchronisation signal (SSS) in a secondary synchronisation channel (P-SCH), at predetermined fixed locations (in both frequency and time) within each radio frame, and hence at a fixed periodicity, as set out in 3GPP TS 36.211 V10.2.0. In this example, the macro base station 5 is also configured to control operation of a 'cluster' comprising two small cell base stations 6-3 and 6-4 and hence their corresponding small cells 9-3, 9-4, that share a common physical cell identity (PCI), and group cell identity (and hence a common Cell ID which is defined by the PCI and group cell identity), although the macro base station 5, and each small cell base station 6-3, 6-4 of the cluster represent a different distinct transmission point.

Each small cell base station 6 is also configured to provide discovery signals on a physical discovery channel (PDCH) to allow a mobile communication device 3 to discover, and achieve synchronisation with, the small cell base station 6. However, unlike the discovery signals transmitted by the macro base station 6, the discovery signals transmitted by each small base station 6 are not transmitted at a fixed periodicity but are, instead, transmitted at a flexible periodicity that can be configured, and reconfigured, by the small cell base station or the macro cell base station controlling the small cell base station 6. This extra flexibility is particularly beneficial because it allows a very wide range of periodicities (or 'repetition intervals') of anything from a few subframes to several hundred radio frames or greater to be configured thereby helping to ensure that small cell base stations can be configured to consume less power and the overhead introduced by discovery signals can be reduced in dependence on the configured periodicity. Further, even in the presence of a relatively dense population of small cell base stations 6 the chances of several respective PSS and SSS being transmitted at the same time (or within close temporal proximity to one another) for different small cell base stations, is relatively low.

The discovery signals provided by each small cell base station 6 beneficially re-use the structure of the PSS and SSS used by the macro base station 5 thereby providing at least some backwards compatibility with legacy mobile communication devices. In the exemplary embodiments described herein, however, the discovery signals provided by each small cell base station 6 are, however, further enhanced: to reduce the size of the search window that the mobile communication device 3 needs to employ; to improve the speed with which a search can be carried out; to improve the reliability of a cell search procedure; to enhance time and/or frequency tracking; to allow measurement (e.g. of Reference Signal Received Quality (RSRQ)/Reference Signal Received Power (RSRP) and/or to allow additional information (such as additional cell identification/transmission point identification information) to be represented by the discovery signal and obtained, at the time of discovery, by suitably enhanced mobile communication devices 3.

In some exemplary embodiments, the discovery signals are enhanced in the time domain by including additional PSS and/or SSS type signals in each subframe. In other exemplary embodiments, the discovery signals are enhanced in the frequency domain by expanding the frequency range over which the PSS and/or SSS type signals are transmitted. Moreover, it will be appreciated that by combining the time-domain and frequency domain discovery signal enhancements of different exemplary embodiments the respective benefits of the different enhancements combine together to provide a greater cumulative benefit albeit at the expense of greater discovery signal overhead.

The introduction of the new discovery signal (on the PDCH) therefore helps to facilitate the search for, acquisition of, and synchronisation with a small cell base station, by a mobile communication device 3. Depending on the way in which the new discovery signal is implemented, one or more of the following additional benefits arise compared, for example, with using a conventional P-SCH/S-SCH structure: power savings in mobile communication device and/or small cell base station; a relatively quick search for/discovery of a small cell; relatively rapid acquisition of measurement results for the purposes of handover, thereby facilitating rapid handover operations; and/or the support of a greater number of physical Cell IDs and/or dedicated transmission point identities.

Base Station

Figure 2:
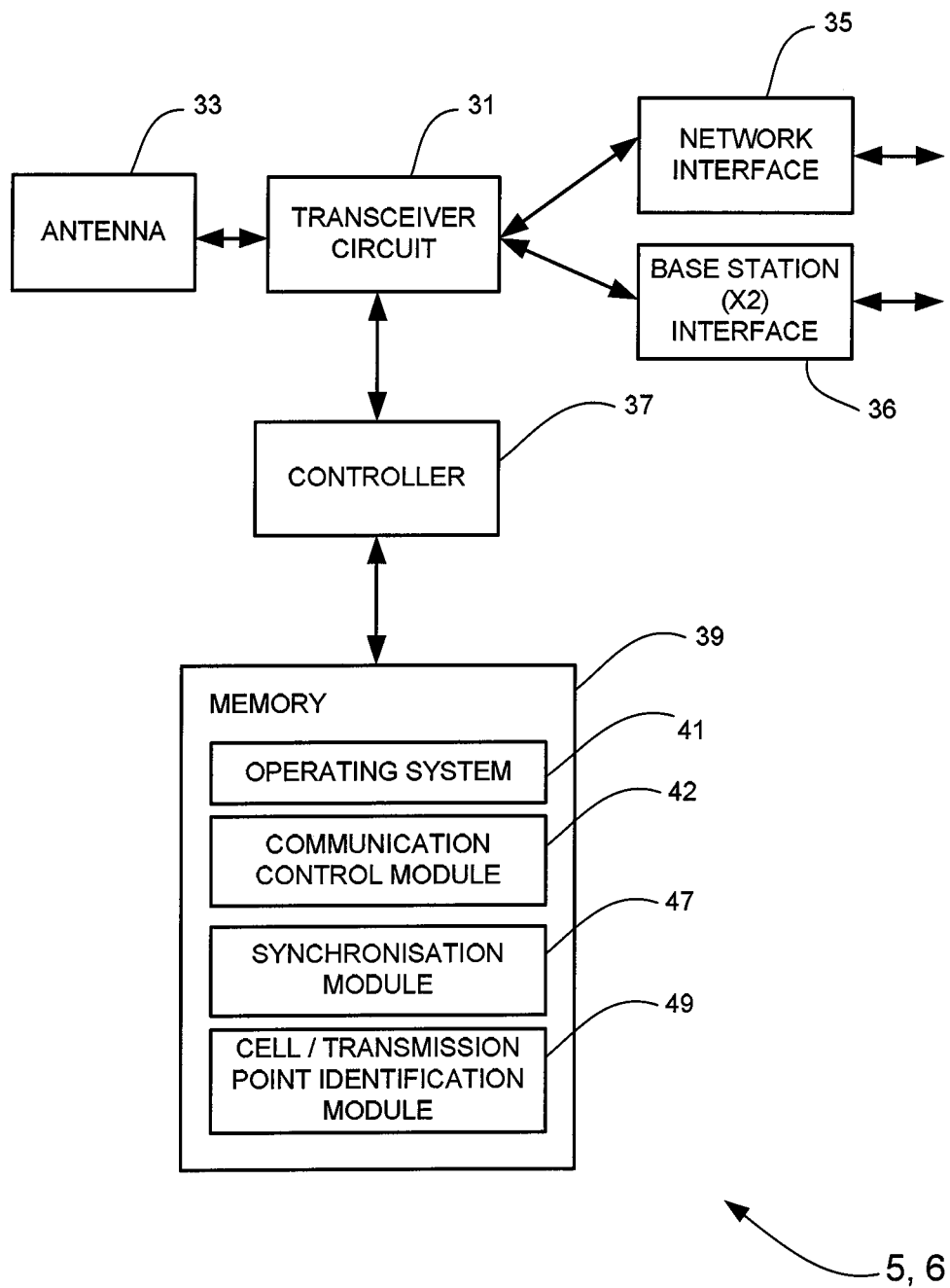
FIG. 2 shows a simplified block diagram of a base station for the telecommunication system of FIG. 1.

FIG. 2 is a block diagram illustrating the main components of a base station 5, 6 as shown in FIG. 1. The base station 5, 6 comprises an E-UTRAN multi-carrier capable base station comprising a transceiver circuit 31 which is operable to transmit signals to, and to receive signals from, the mobile communication devices 3 via at least one antenna 33. The base station 5, 6 is also operable to transmit signals to and to receive signals from: a core network via a network interface 35 (optionally via a small cell gateway or the like in the case of a small cell base station (not shown)); and other base stations 5, 6 in the vicinity via a base station (or so called 'X2') interface 36. The operation of the transceiver circuit 31 is controlled by a controller 37 in accordance with software stored in memory 39.

The software includes, among other things, an operating system 41, a communication control module 42, a synchronisation module 47, and a cell/transmission point identification module 49.

The communication control module 42 is operable to control communication with the mobile communication devices 3 via the antenna 33 and with the core network and other base stations via the network interface 35 and the X2 interface 36 respectively. The synchronisation module 47 manages the generation and transmission of discovery signals at appropriate locations in a radio frame 210 (see FIG. 4) as required and, in the case of the small cell base station 6, the configuration and reconfiguration of the periodicity of the discovery signals, and the encoding of appropriate information into the discovery signal as appropriate. The cell/transmission point identification module 49 generates identification information for the cell/transmission point such as the Cell ID (cell group ID/physical cell ID (PCI)) and/or transmission point ID (e.g. for small cells sharing the same Cell ID as other cells in a cluster of cells) for encoding into the discovery signals by the synchronisation module 47.

In the above description, the base station 5 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Mobile Communication Device

Figure 3:
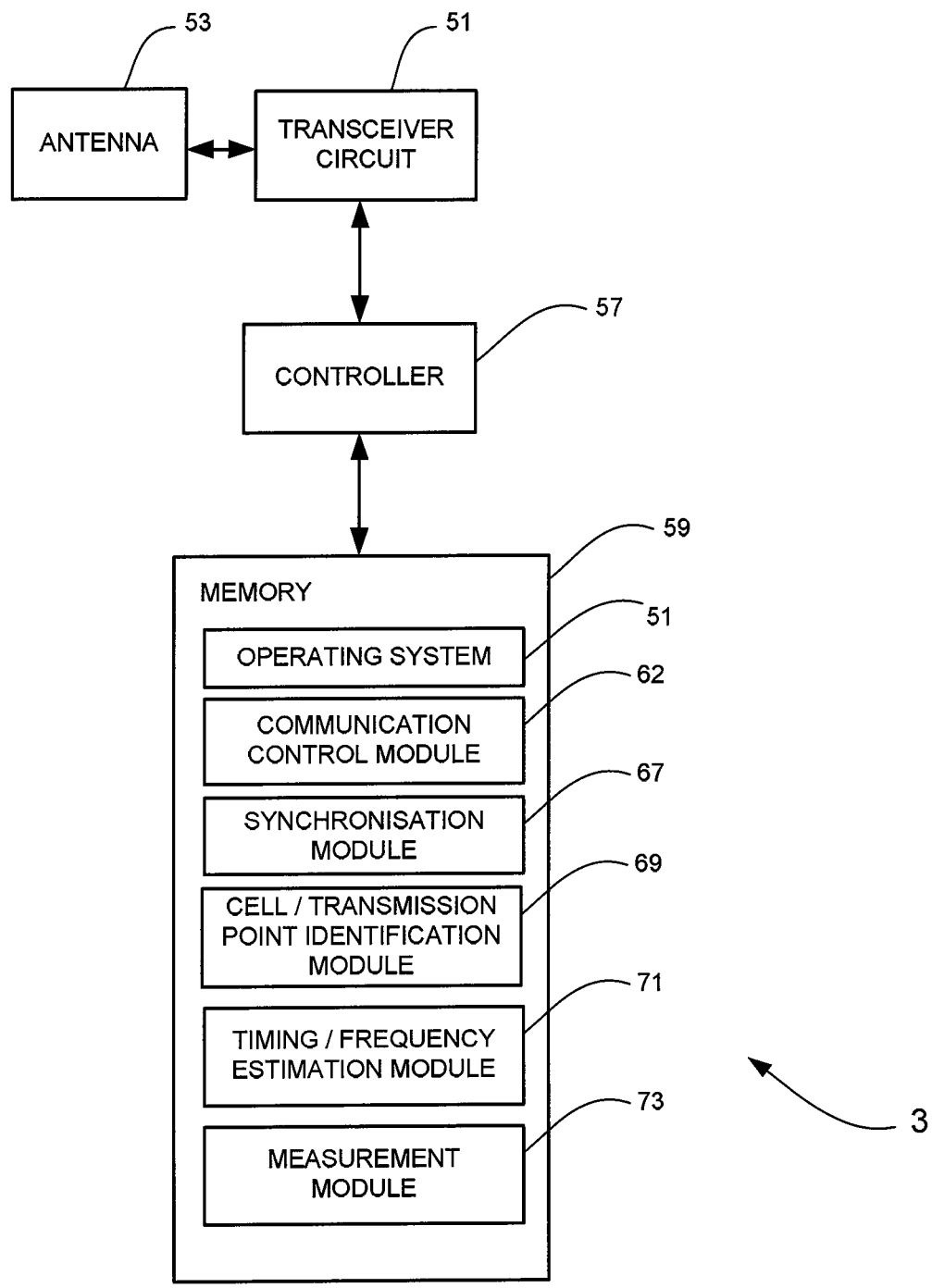
FIG. 3 shows a simplified block diagram of a mobile communication device for the telecommunication system of FIG. 1.

FIG. 3 is a block diagram illustrating the main components of the mobile communication devices 3 shown in FIG. 1. Each mobile communication device 3 comprises a mobile (or 'cell' telephone) capable of operating in a multi-carrier environment. The mobile communication device 3 comprises a transceiver circuit 51 which is operable to transmit signals to, and to receive signals from, the base stations 5, 6 via at least one antenna 53. The operation of the transceiver circuit 51 is controlled by a controller 57 in accordance with software stored in memory 59.

The software includes, among other things, an operating system 51, a communication control module 62, a synchronisation module 67, a cell/transmission point identification module 69, a timing/frequency estimation module 71 and a measurement module 73.

The communication control module 62 is operable for managing communication with the base stations 5, 6. The synchronisation module 67 manages synchronisation of the mobile communication device 3 with the radio frame/subframe timing of the base station 5, 6. The synchronisation module 67 also manages the identification of the discovery signal configuration such as the location of the PSS/SSS within each radio frame 210 (see FIG. 4) and the decoding of appropriate information from the discovery signal as appropriate. The cell/transmission point identification module 69 determines identification information for the cell/transmission point such as the Cell ID (cell group ID/PCI) and/or transmission point ID (e.g. for small cells sharing the same Cell ID as other cells in a cluster of cells) from the information encoded into the discovery signals by the synchronisation module 67.

The timing/frequency estimation module 71 is configured for performing timing and/or frequency estimation using the discovery signals generated and transmitted by the small cell base station 6. The measurement module 73 is configured for performing measurements (e.g. RSRP/RSRQ measurements) on the discovery signals generated and transmitted by the small cell base station 6.

In the above description, the mobile communication device 3 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Discovery Signal Configuration

The way in which the discovery signals are configured in the present exemplary embodiment will now be described in more detail, by way of example only, with reference to FIGS. 4 to 15.

Figure 4:
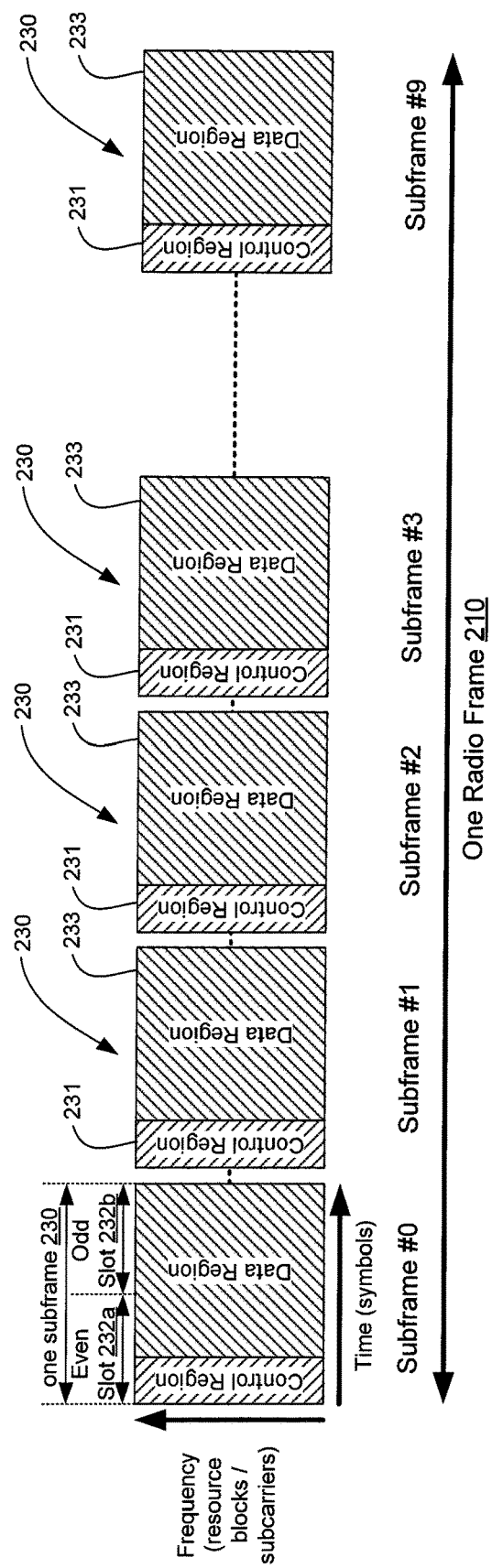
FIG. 4 shows an illustration of a typical radio frame used for communication in the telecommunication system of FIG. 1.

FIG. 4 illustrates the structure of a radio frame 210 of the type used for communication by the base stations 5, 6 and mobile communication devices 3 of the mobile (cellular) telecommunication system 1. As seen in FIG. 4, each base station 5 is configured to transmit control information and data to associated mobile communication devices using radio frames 210. Each radio frame 210, in this exemplary embodiment, is 10 ms long and as seen in FIG. 4 comprises a plurality of orthogonal frequency division multiplexing (OFDM) subframes 230 (in this exemplary embodiment ten 1 ms subframes which are indexed '0' through '9' make up a radio frame 210). Each subframe comprises a pair of slots 232a and 232b (in this exemplary embodiment 0.5 ms long). For the purposes of referencing, the slots 232 are typically referred to by index numbers ranging from '0' to '19' in chronological order (from left to right on FIG. 4) with the first slot 232a of each subframe 230 having an even number and the second slot 232b having an odd number. Part of the first ('even numbered') slot of each subframe 230 comprises a so called 'control' region 231 that is generally reserved for the transmission of control information. The remainder of the first ('even numbered') slot of each subframe 230 and the second ('odd numbered') slot of each subframe 230 comprises a so called 'data' region 233 that is generally used for the transmission of data, for example in a Physical Downlink Shared Channel (PDSCH).

Figure 5:
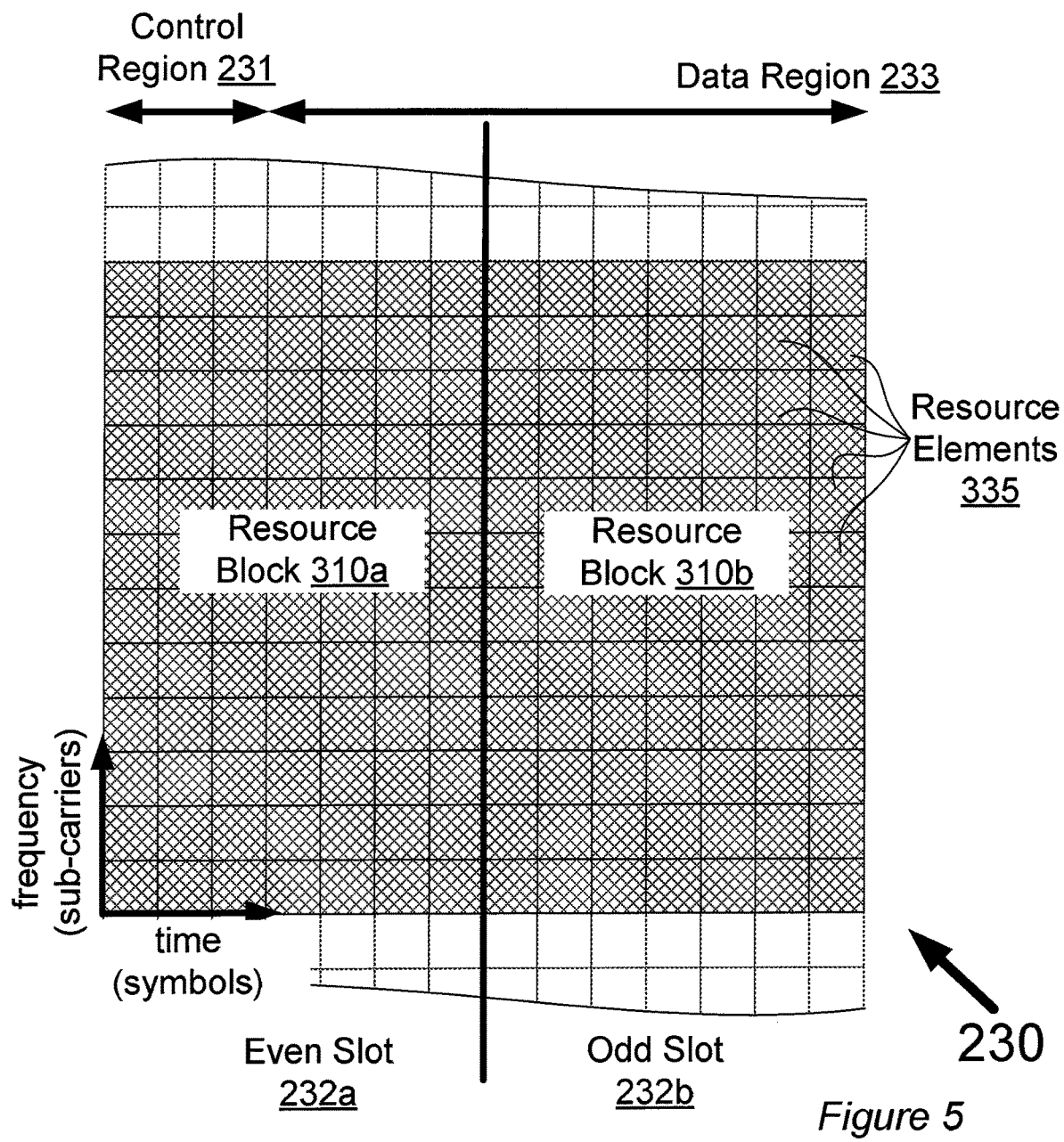
FIG. 5 shows an illustration of part of a typical subframe of the radio frame used for communication in the telecommunication system of FIG. 1.

FIG. 5 shows a resource grid for part of one of the OFDM subframes 230 of FIG. 4. The resource grid shown is for a resource block (RB) pair 310a, 310b (represented by hatched region) with each RB 310a, 310b of the pair having, for example, a resource grid similar to that described in section 6.2 of the 3$^{rd}$ Generation Partnership Project (3GPP) Technical Standard (TS) 36.211 V10.2.0 and shown in FIG. 6.2.2-1 of that standard.

As seen in FIG. 5, each resource block 310a and 310b is part of a respective slot 232a and 232b of the subframe 230. Each resource block 310a, 310b comprises a set of resource elements 335 defined in frequency by 12 subcarrier frequencies (rows) and in time by 7 symbols (columns). In this embodiment, the control region 231 comprises the resource elements 335 of the first three OFDM symbols of the first slot 232a of each subframe 230. The remaining resource elements 335 of the first slot 232a and the resource elements 335 of the second slot 232b form the data region 333.

As described above, each base station 5, 6 is configured to provide discovery signals at particular locations (in frequency and time) in corresponding radio frames 210 to allow the mobile communication device 3 to discover and achieve synchronisation with the base station 5, 6.

Each discovery signal comprises a PSS that can be used by the mobile communication device 3 to synchronise receipt and transmission of each symbol, slot and subframe with the corresponding symbol, slot and/or subframe timings of the corresponding base station 5, 6. Further, the PSS is also used by the mobile communication device 3 to identify other information about the cell to which it relates, for example, cell identity information such as a physical layer cell identity (PCI). Each discovery signal also comprises an SSS that is used by the mobile communication device 3 to synchronise receipt and transmission of each radio frame 210 with the associated frame timings of the corresponding base station 5, 6. The SSS is also used by the mobile communication device 3 to identify other information about the cell to which they relate, for example cell group identity information such as the physical layer cell identity group for the base station 5, 6.

Figure 6:
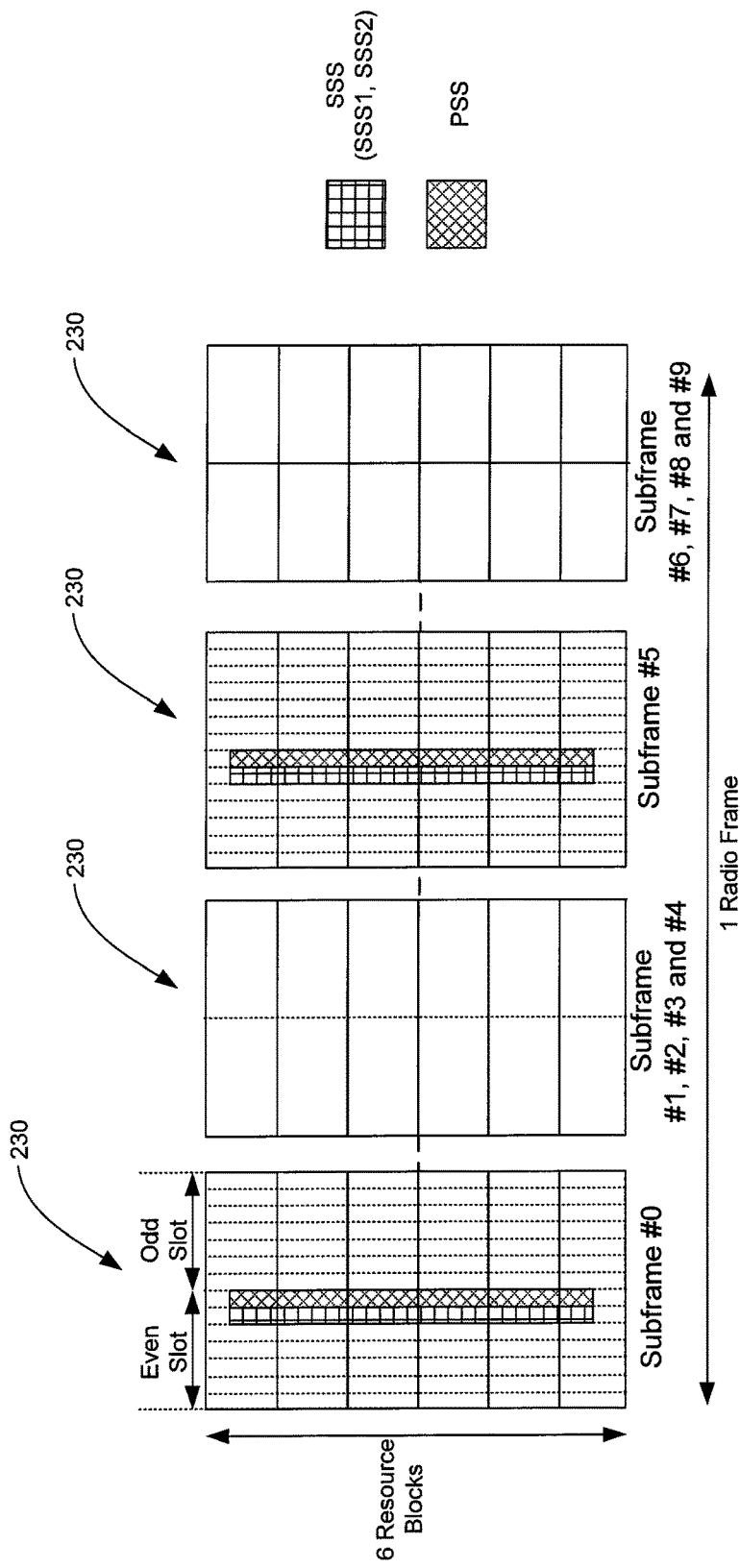
FIG. 6 shows an illustration of an example of how synchronisation signals may typically be transmitted in a macro cell of the telecommunication system of FIG. 1.

FIG. 6 illustrates how the discovery signals are configured in the radio frames 230 for the macro cell 7 of the macro base station 5.

As seen in FIG. 6, in the case of macro cell 7, the macro base station 5 always provides the synchronisation signals (PSS/SSS) in the last two symbols of the first (even numbered) slot 232a in the first subframe 230 (subframe #0) and in the last two symbols of the first (even numbered) slot 232a in the sixth subframe 230 (subframe #5). The PSS is transmitted in the last symbol of the first slot 232a of the first and sixth subframes, whilst the SSS is transmitted in the second to last symbol of the first slot 232a of the first and sixth subframes 230 (i.e. the last symbol of slot #0 and slot #10).

The PSS and SSS are each allocated the central 62 subcarriers belonging to symbols in which they are respectively located. The 5 resource elements above and below the synchronisation signals are not used for transmission and hence the PSS and SSS each account for the central 72 subcarriers (6 resource blocks). Thus, the PSS and SSS transmissions each use six resource blocks (with 10 resource elements left unused) and the indexes of the resource blocks (resource block numbers) within the frequency band covered by the macro cell 7 are always the same.

The sequence d(n) used for the PSS is generated from a frequency-domain Zadoff-Chu sequence as follows:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the Zadoff-Chu root sequence index u depends on the PCI and is one of the indices 25, 29 and 34.

The sequence d(0), . . . , d(61) used for the SSS comprises an interleaved concatenation of two length-31 binary sequences. The concatenated sequence is scrambled with a scrambling sequence given by the PSS.

The combination of two length-31 sequences defining the secondary synchronization signal differs between subframe #0 and subframe #5 according to:

$$d(2n) = \begin{cases} s_0^{(m_0)}(n)c_0(n) & \text{in subframe0} \\ s_1^{(m_1)}(n)c_0(n) & \text{in subframe5} \end{cases}$$

$$d(2n+1) = \begin{cases} s_1^{(m_1)}(n)c_1(n)z_1^{(m_0)}(n) & \text{in subframe0} \\ s_0^{(m_0)}(n)c_1(n)z_1^{(m_1)}(n) & \text{in subframe5} \end{cases}$$

where $0 \leq n \leq 30$. The indices $m_0$ and $m_1$ are derived from the physical-layer cell-identity group.

Thus, the two PSS transmissions within a radio frame 210 are identical. The two SSS transmissions within each radio frame 210 (referred to as SS1 and SS2), however, use different sequences to allow the mobile communication device 3 to differentiate between the $1^{st}$ and $2^{nd}$ transmission thereby allowing the mobile communication device 3 to achieve frame synchronisation.

As a skilled person will understand, further details on the implementation of the PSS and SSS for a typical macro cell 7 may be found in TS 36.211 section 6.11.1 and 6.11.2 respectively.

Figure 7:
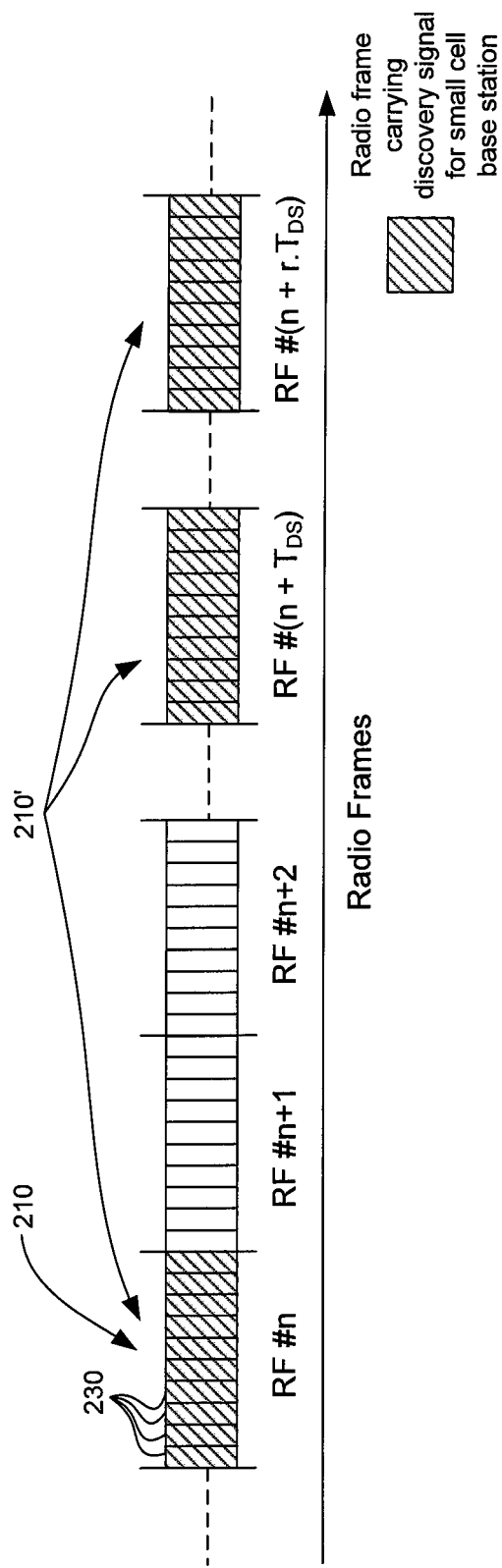
FIG. 7 shows an illustration of an example of how discovery signals may be transmitted in radio frames of a small cell of the telecommunication system of FIG. 1.

Referring to FIG. 7, however, whilst each small cell base station 6 of this exemplary embodiment still provides discovery signals comprising synchronisation signals (PSS/SSS) encoded in the same manner as for the macro cell, the periodicity with which the small cell base station 6 transmits the discovery signals is individually configurable by each small cell base station 6.

In the example illustrated in FIG. 7 the periodicity '$T_{DS}$' is set to a suitable number of radio frames (e.g. 50, 100, 200, 1000, 2000 or any other appropriate number). Accordingly, as seen in FIG. 7, when the first discovery signal is transmitted in radio fame number 'n', the next discovery signal is transmitted in radio fame number 'n+$T_{DS}$', the next in radio fame number 'n+2·$T_{DS}$' and so on. More specifically, the discovery signal is transmitted in radio fame number 'n+r·$T_{DS}$' where r is an integer that starts at zero for radio fame number 'n' and increments by one for each subsequent radio fame in which the discovery signal is transmitted. It will be appreciated that whilst FIG. 7 shows a configuration based on a periodicity defined in terms of a number of radio frames, a configuration based on a periodicity defined in terms of a number of subframes (e.g. $T^{SF}_{DS}$) is also possible (e.g. where the first discovery signal is transmitted in subfame number 'n', the next discovery signal is transmitted in subfame number 'n+$T^{SF}_{DS}$', the next in subfame number 'n+2·$T^{SF}_{DS}$' and so on).

Figure 8:
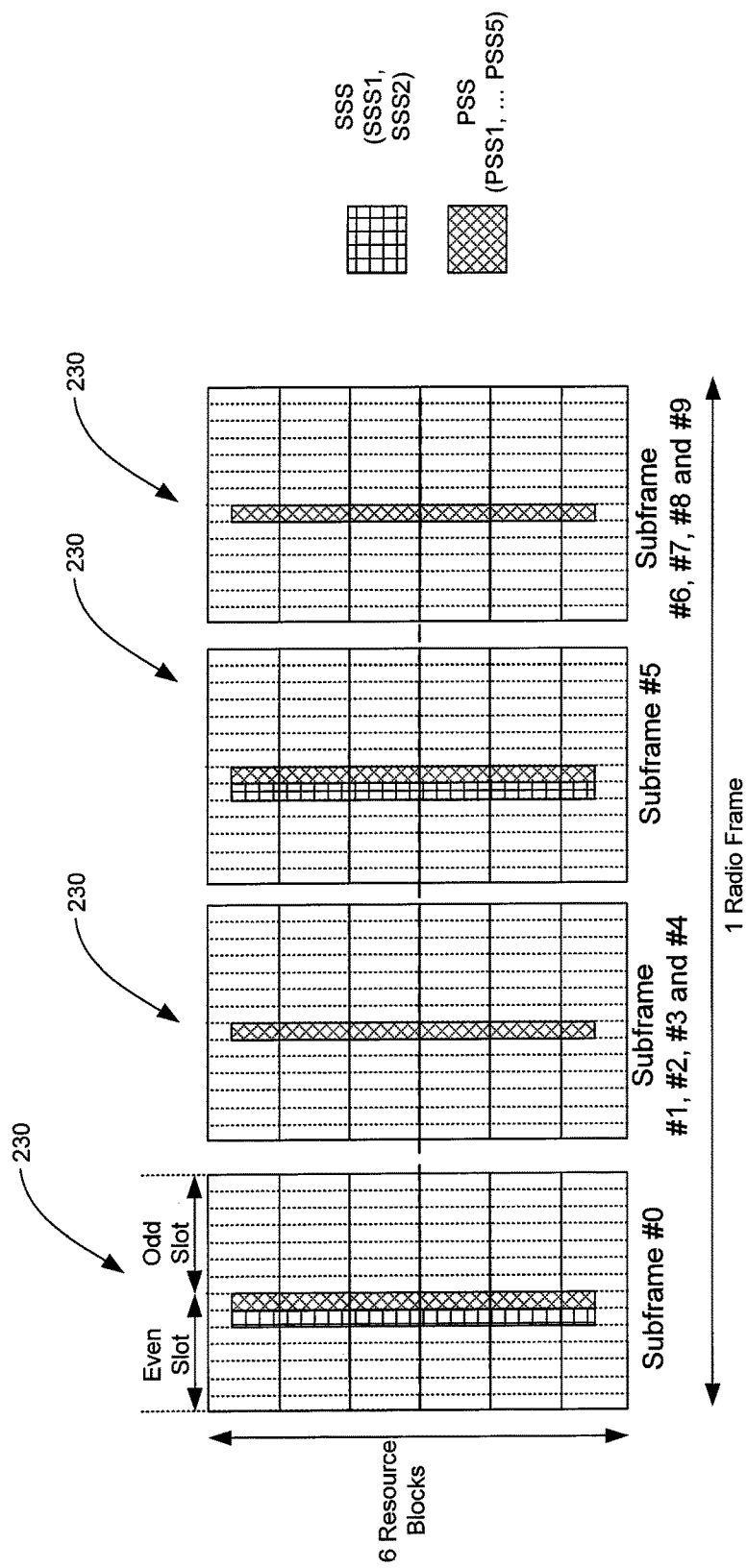
FIG. 8 shows an illustration of an example of how discovery signals may be transmitted in a small cell of the telecommunication system of FIG. 1.

FIG. 8, illustrates an exemplary radio frame, transmitted by a small cell base station 6, in which the discovery signal is enhanced in the time domain. In the example of FIG. 8, in addition to the legacy PSS (PSS1) and SSS (SSS1) transmitted in the first (even) slot of the first subframe (#0) and the legacy PSS (PSS1) and SSS (SSS2) transmitted in the first slot of the sixth subframe (#5), the discovery signal comprises a set of four extra PSSs (PSS2, . . . , PSS5) that are transmitted in, and distributed throughout, each 5 ms half of the 10 ms radio frame in which the discovery signal is provided.

In the example of FIG. 8 the additional PSSs (PSS2, . . . , PSS5) are transmitted at regular intervals in consecutive subframes. Specifically, in the example of FIG. 8, the additional PSSs (PSS2, . . . , PSS5) are each shown to be transmitted in the last symbol of the first (even numbered) slot of a respective one of subframes #1 to #4 and then repeated in the last symbol of the first (even numbered) slot of a respective one of subframes #6 to #9. It will be appreciated, however, that the new PSSs could be transmitted in other symbols.

This has the benefit of helping to reduce the search window size for a mobile communication device 3 from 5 ms to 1 ms when there is no timing information provided to the mobile communication device 3 in advance, and also improves measurement quality, albeit at the expense of signalling overhead in the form of a few extra resources (resource elements) allocated for discovery purposes.

In the example of FIG. 8 each additional PSS (PSS2, . . . , PSS5) has a respective Zadoff-Chu root sequence index to differentiate it from the legacy PSS (PSS1) transmitted in subframes #0 and #5. It will be appreciated, however, that any or all of the new PSSs could simply be a repetition of the existing PSS if differentiation is not required.

Figure 9:
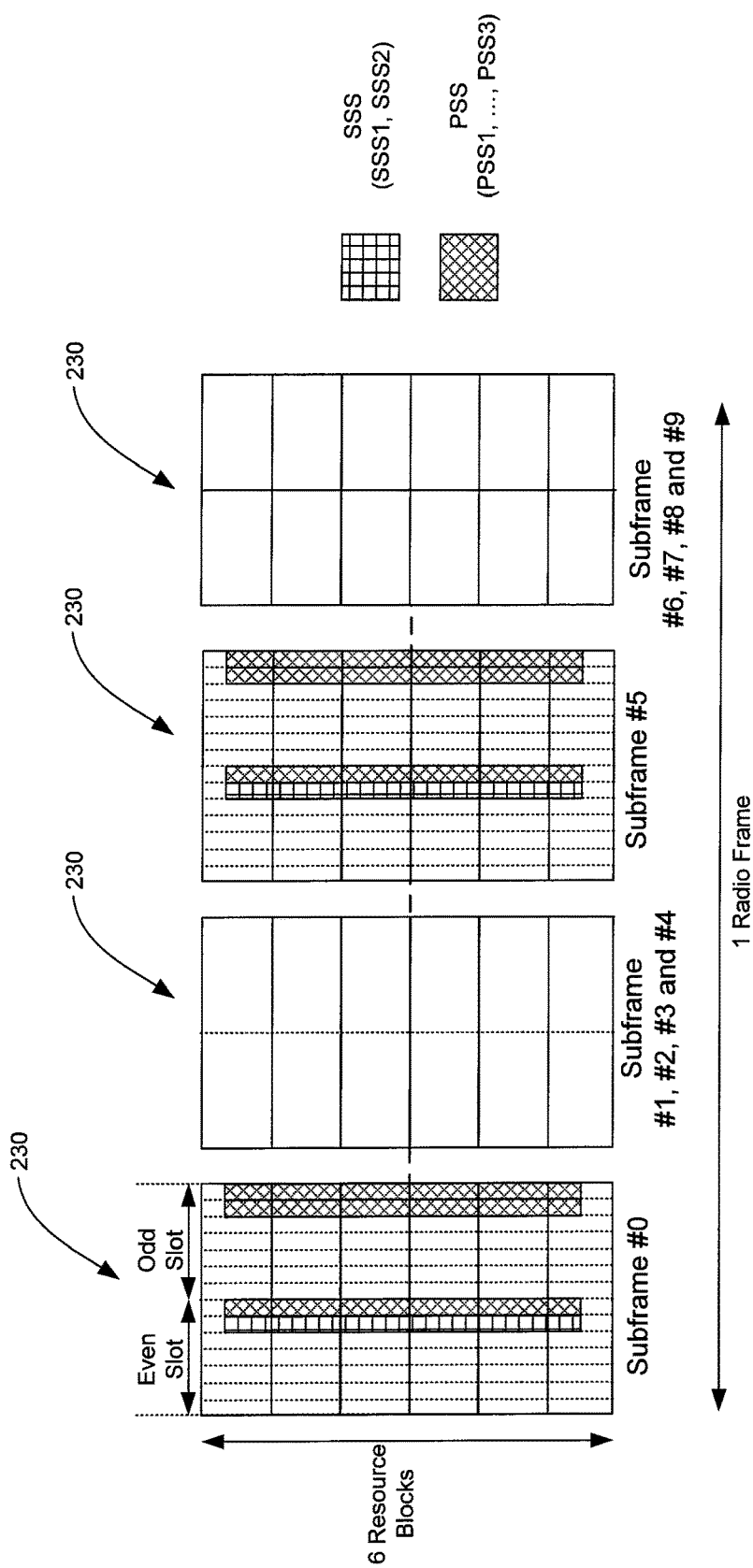
FIG. 9 shows an illustration of another example of how discovery signals may be transmitted in a small cell of the telecommunication system of FIG. 1.
Figure 10:
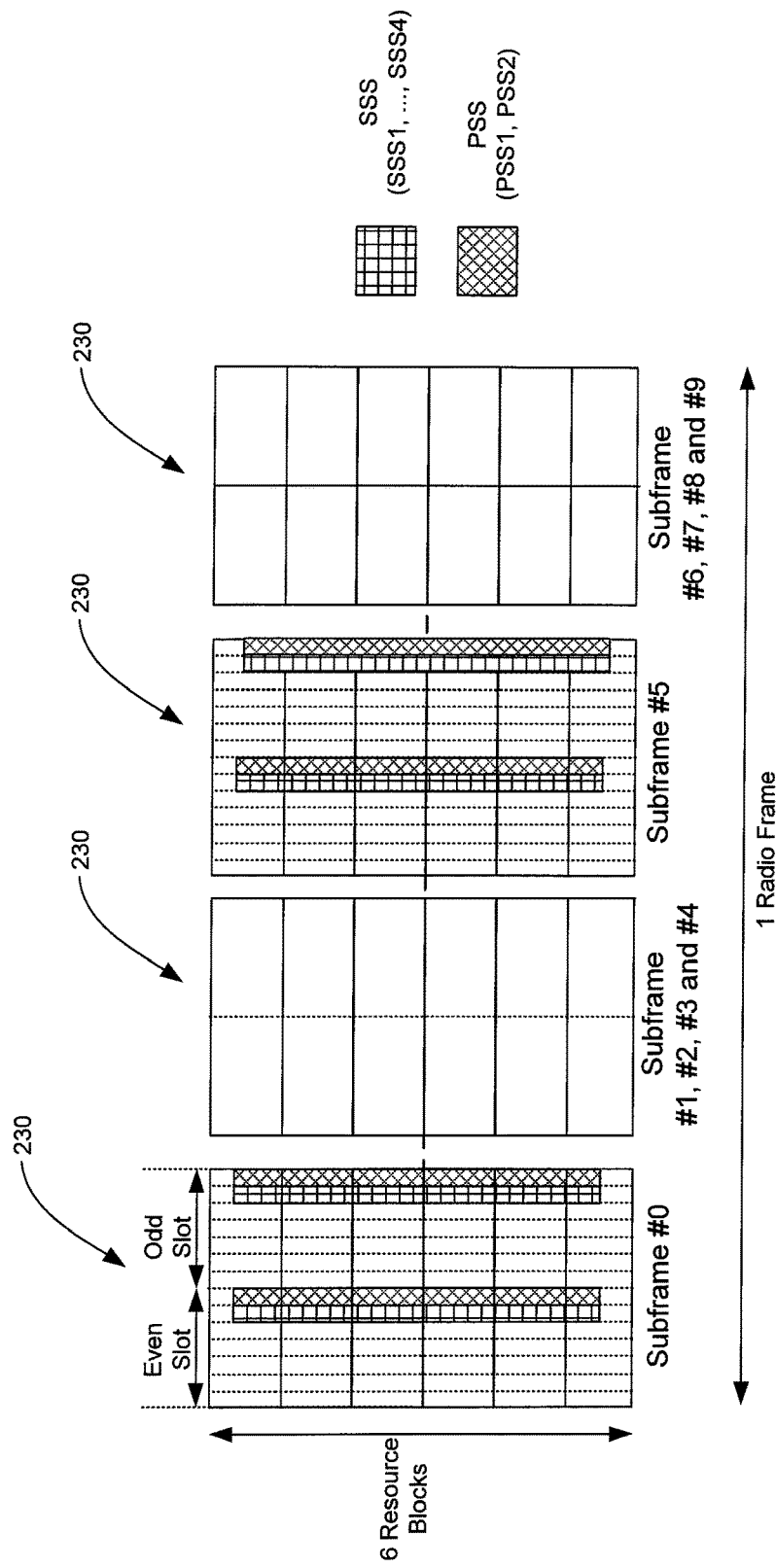
FIG. 10 shows an illustration of another example of how discovery signals may be transmitted in a small cell of the telecommunication system of FIG. 1.

FIGS. 9 and 10, each illustrates another exemplary radio frame, transmitted by a small cell base station 6, in which the discovery signal is enhanced in the time domain. In the examples of FIGS. 9 and 10, in addition to the legacy PSS (PSS1) and SSS (SSS1) transmitted in the first (even) slot of the first subframe (#0) and the legacy PSS (PSS1) and SSS (SSS2) transmitted in the first slot of the sixth subframe (#5), the discovery signal comprises a second pair of synchronisation signals in the respective second (odd) slot of each of the first and sixth subframes, i.e., 0.5 ms apart from the corresponding legacy pair of synchronisation signals.

The close proximity of the legacy and the new synchronisation signals in this exemplary embodiment (and other exemplary embodiments) beneficially allows frequency estimation to be performed, using the discovery signal, without requiring the use of cell specific reference signals (CRS), thereby improving efficiency compared to current systems.

In the example of FIG. 9 the second pair of synchronisation signals in each of the first and sixth subframes comprises a pair of PSSs (PSS2 & PSS3) whereas in the example of FIG. 10 the second pair of synchronisation signals in each of the first and sixth subframes comprises an additional SSS (SSS3 & SSS4) followed by an additional PSS (PSS2).

As with the examples of FIGS. 9 and 10 each have the benefit of helping to reduce the search window size for a mobile communication device 3 and also improves measurement quality, albeit at the expense of signalling overhead in the form of a few extra resources (resource elements) allocated for discovery purposes.

In the examples of FIGS. 9 and 10 each additional PSS (PSS2/PSS3) and/or SSS (SSS3, SSS4) has a respective Zadoff-Chu root sequence index to differentiate it from its legacy counterpart. It will be appreciated, however, that any or all of the new synchronisation signals could simply be a repetition of the corresponding legacy synchronisation signal if differentiation is not required.

As explained above, the close proximity of the legacy and the new synchronisation signals beneficially allows frequency estimation to be performed, using the discovery signal, without requiring the use of cell specific reference signals (CRS), thereby improving efficiency compared to current systems.

Figure 11:
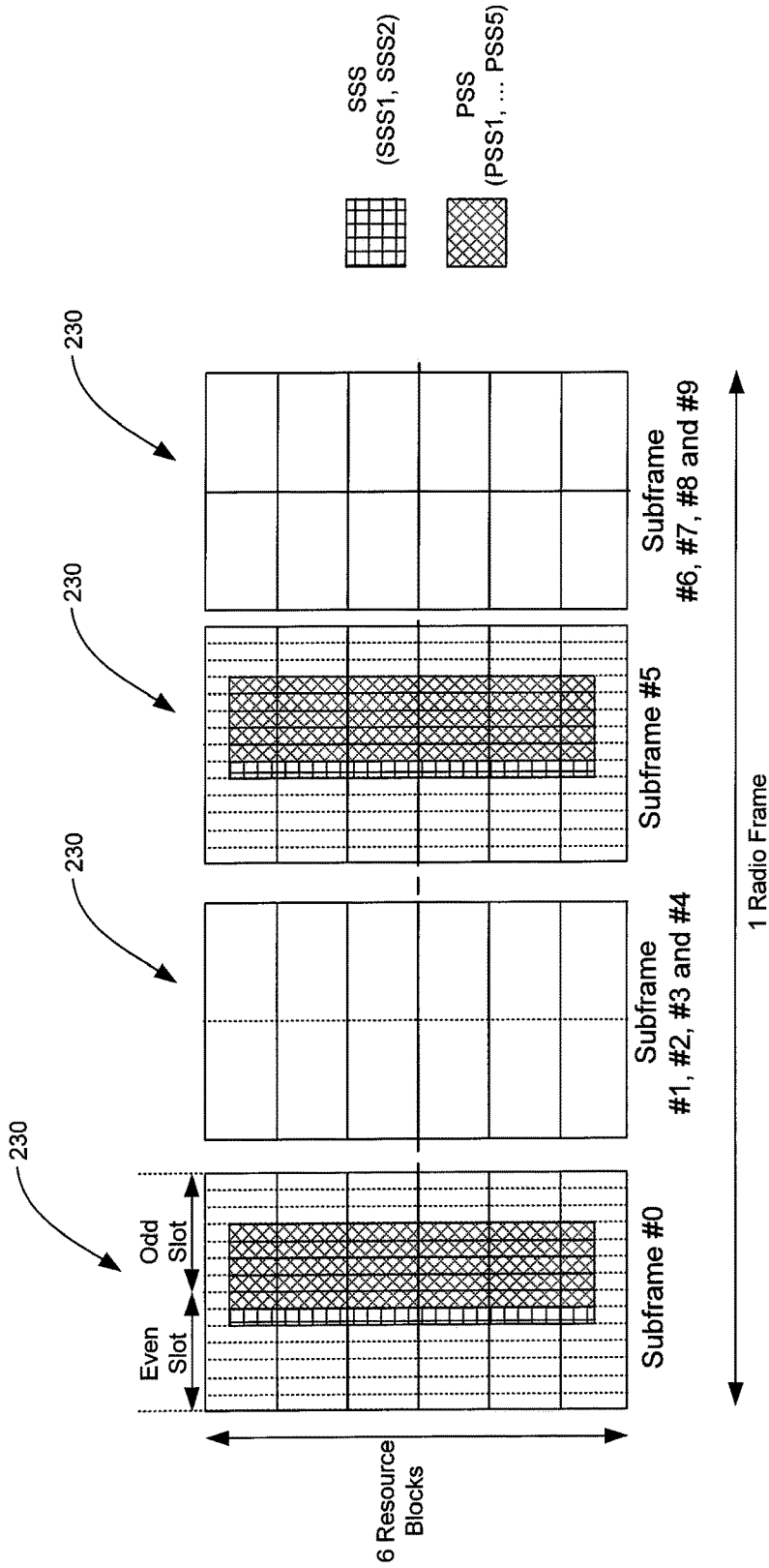
FIG. 11 shows an illustration of another example of how discovery signals may be transmitted in a small cell of the telecommunication system of FIG. 1.

FIG. 11 illustrates another exemplary radio frame, transmitted by a small cell base station, in which the discovery signal is enhanced in the time domain. In the example of FIG. 11, in addition to the legacy PSS (PSS1) and SSS (SSS1) transmitted in the first (even) slot of the first subframe (#0) and the legacy PSS (PSS1) and SSS (SSS2) transmitted in the first slot of the sixth subframe (#5), the discovery signal comprises a set of four extra PSSs (PSS2, . . . , PSS5) that are transmitted over consecutive symbols following the respective legacy PSS (PSS1) in the respective second (odd) slot of each of the first and sixth subframes.

This discovery signal format is particularly beneficial in helping a mobile communication device 3 to quickly detect the timing reference in a cell search process, and like the previous examples, helps to improve time and frequency estimation performance and measurement quality.

In the example of FIG. 11 each additional PSS (PSS2, . . . , PSS5) has a respective Zadoff-Chu root sequence index to allow differentiation from its legacy counterpart. It will be appreciated, however, that any or all of the new synchronisation signals could simply be a repetition of the corresponding legacy synchronisation signal if differentiation is not required. It will be further appreciated that each SSS (SSS1 and SSS2) may use the same or a different Zadoff-Chu root sequence index.

Figure 12:
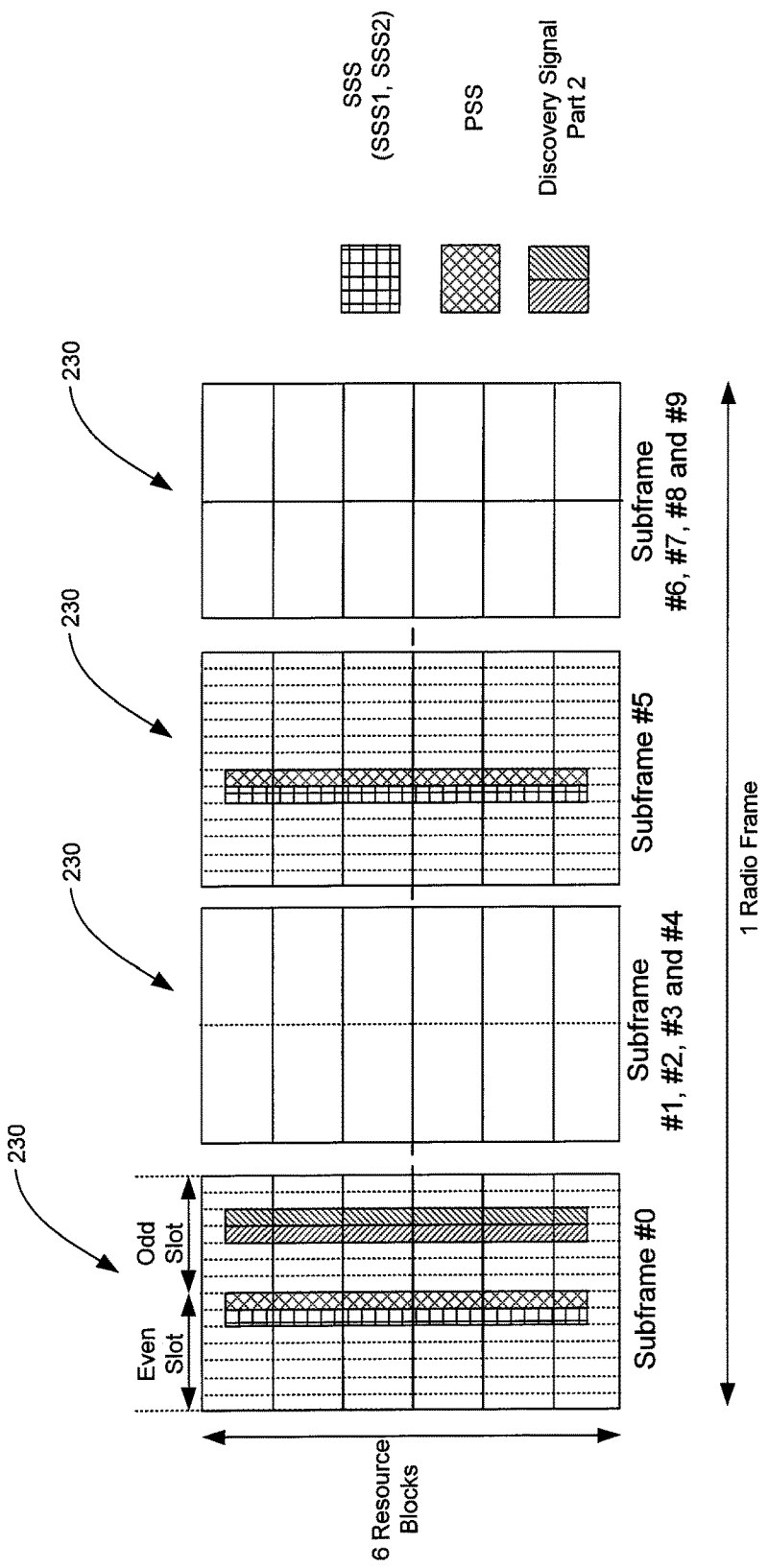
FIG. 12 shows an illustration of another example of how discovery signals may be transmitted in a small cell of the telecommunication system of FIG. 1.

FIG. 12 illustrates another exemplary radio frame, transmitted by a small cell base station 6, in which the discovery signal is enhanced in the time domain. In the example of FIG. 12, in addition to the legacy PSS (PSS1) and SSS (SSS1) transmitted in the first (even) slot of the first subframe (#0), the discovery signal comprises a second discovery signal part comprising a pair of signals in the respective second (odd) slot of the first subframe, i.e., 0.5 ms apart from the corresponding legacy pair of synchronisation signals in that subframe.

The second set of signals in the example of FIG. 12 is formed by wrapping/multiplexing an additional PSS/SSS (e.g. as described for the first subframe with reference to FIG. 9 or 10) with a masking code such as an orthogonal code, or a cyclically shifted version of a Zadoff-Chu sequence, to encode a unique identifier for the small cell (e.g. a 'small cell ID' or 'transmission point ID') e.g. within a cluster of small cells having the same Cell ID encoded into the legacy PSS/SSS.

By using the legacy PSS/SSS in conjunction with the second discovery signal part, a modified mobile communication device 3 can detect the Cell ID and also derive each small cell/transmission point ID within the cluster based on the second discovery signal part whilst a legacy mobile communication device can still detect the Cell ID.

It will be appreciated that the second discovery signal part can also be used to identify the status of the detected cell, such as dormancy/cell load, e.g., by encoding cell dormancy (i.e., load zero)/cell load information together with appropriate identification information in the the second discovery signal part.

It will be appreciated that the two signals of the second discovery signal part can be the same or different.

Figure 13:
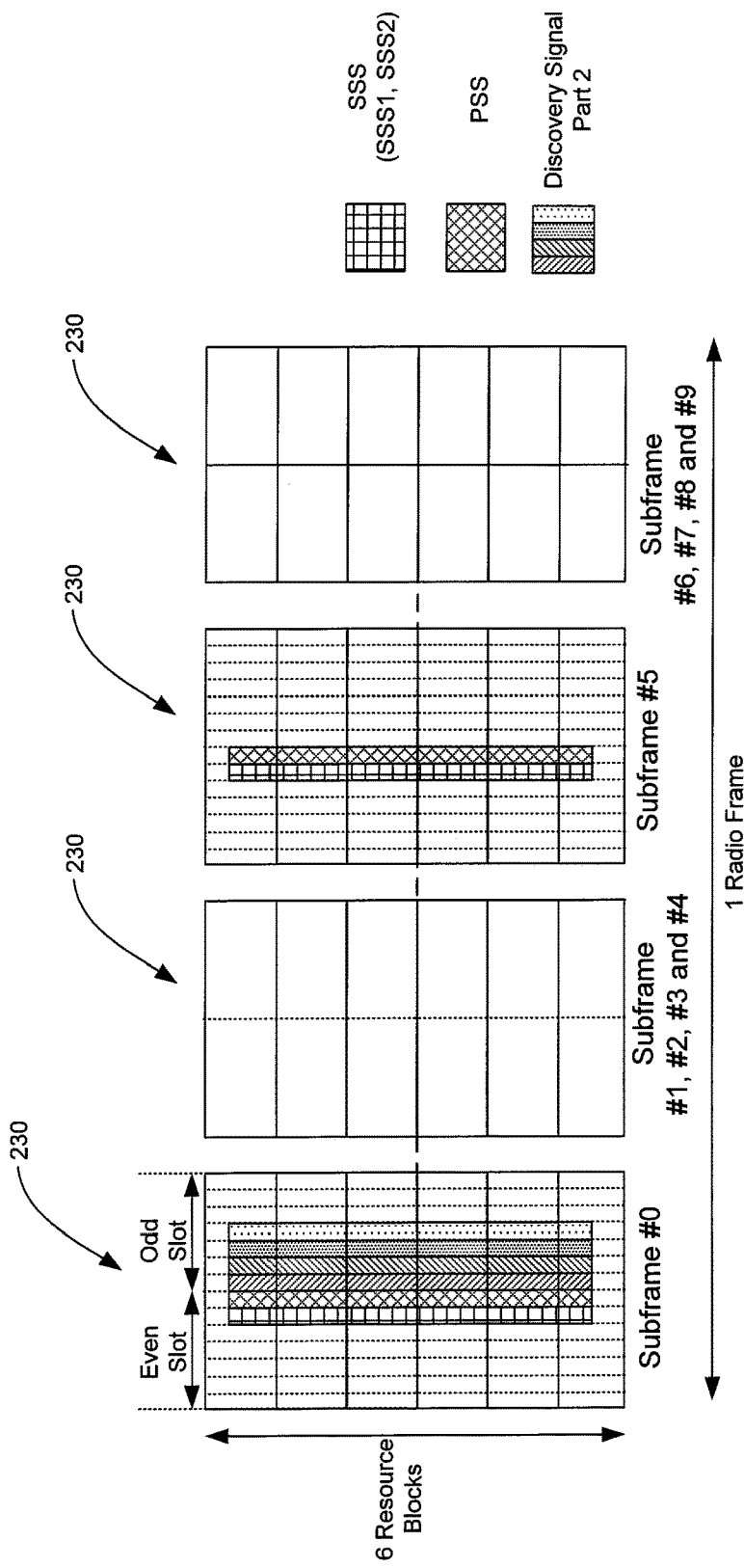
FIG. 13 shows an illustration of another example of how discovery signals may be transmitted in a small cell of the telecommunication system of FIG. 1.

FIG. 13 illustrates another exemplary radio frame, transmitted by a small cell base station 6, in which the discovery signal is enhanced in the time domain. In the example of FIG. 13, in addition to the legacy PSS (PSS) and SSS (SSS1) transmitted in the first (even) slot of the first subframe (#0) and the legacy PSS (PSS) and SSS (SSS2) transmitted in the first slot of the sixth subframe (#5), the discovery signal comprises a second discovery signal part comprising a set of four extra signals that are transmitted over consecutive symbols following the legacy PSS (PSS) in the second (odd) slot of the first subframe.

The second set of signals in the example of FIG. 13 is formed by wrapping/multiplexing an additional PSS/SSS (e.g. as described for the first subframe with reference to FIG. 9 or 10) with a masking code such as an orthogonal code, or a cyclically shifted version of a Zadoff-Chu sequence, to encode a unique identifier for the small cell (e.g. a 'small cell ID' or 'transmission point ID') e.g. within a cluster of small cells having the same Cell ID encoded into the legacy PSS/SSS.

Like the previous example, by using the legacy PSS/SSS in conjunction with the second discovery signal part, a modified mobile communication device 3 can detect the Cell ID and also derive each small cell/transmission point ID within the cluster based on the second discovery signal part whilst a legacy mobile communication device can still detect the Cell ID.

It will be appreciated that in the above examples in which the discovery signal is enhanced in the time domain the enhancement beneficially allows time estimation, frequency estimation and RSRP/RSRQ measurements to be carried out in addition to fast cell discovery.

Having a relatively large number of reference (synchronisation) signals/symbols in the frequency domain compared to cell specific reference signals (CRS), in combination with the relatively close proximity of the discovery signals in the time domain, allows improved timing estimation to be performed, using the discovery signals, instead of using, the CRS. The timing estimation is performed by correlating in the frequency domain a transmitted signal with its replica at the receiver and accumulating the energy of the correlation over a number of OFDM symbols in the time-domain, and detecting the maximum peak of the accumulated correlator output among correct timing candidates within a pre-defined window of timing hypotheses.

Specifically, since frequency estimation is performed based on a pair of reference signals which are apart from one another (but in relative close proximity to one another—e.g. a few to several symbols apart), the close proximity of the synchronisation signals in the above exemplary discovery signals allows frequency estimation to be performed based on a pair of the signals forming the discovery signal (e.g. the PSS, SSS, and/or one or more of the signals forming the second part of the discovery signal) without the need to use other reference signals such as cell specific reference signals (CRS).

For example, in FIG. 10 a set of frequency estimates may be calculated using the first and second SSS of one subframe, and another set of frequency estimates may be calculated using the first and second PSS in the same subframe. These estimates may then be combined to provide more reliable estimates, avoiding the need to use CRS for that purpose (and potentially improving on estimates using CRS).

Regarding measurement, the additional reference signals (comprising synchronisation signals/other dedicated signals) in the discovery signals in the time domain allows such measurements to be performed more efficiently and reliably.

Figure 14:
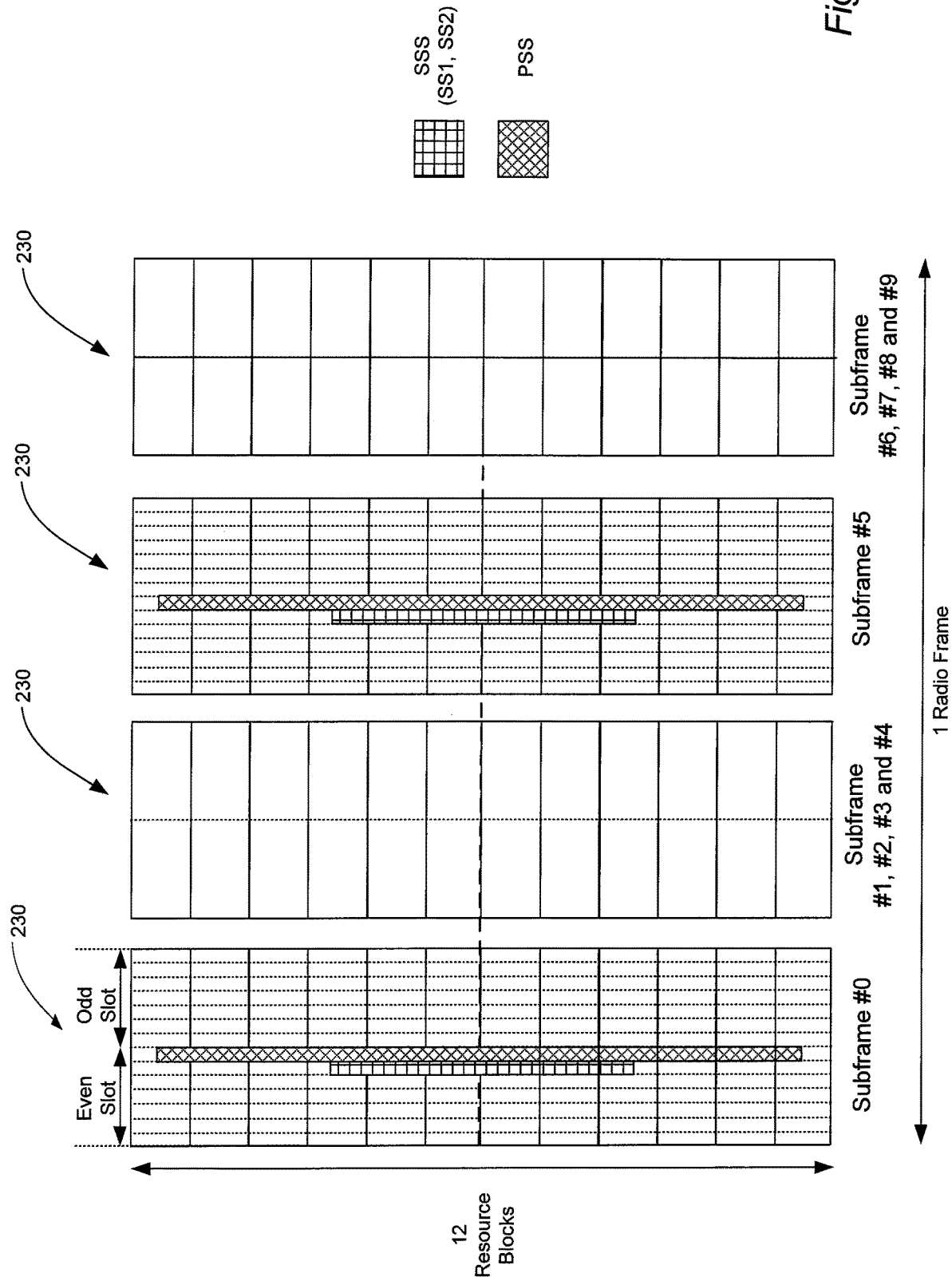
FIG. 14 shows an illustration of another example of how discovery signals may be transmitted in a small cell of the telecommunication system of FIG. 1.
Figure 15:
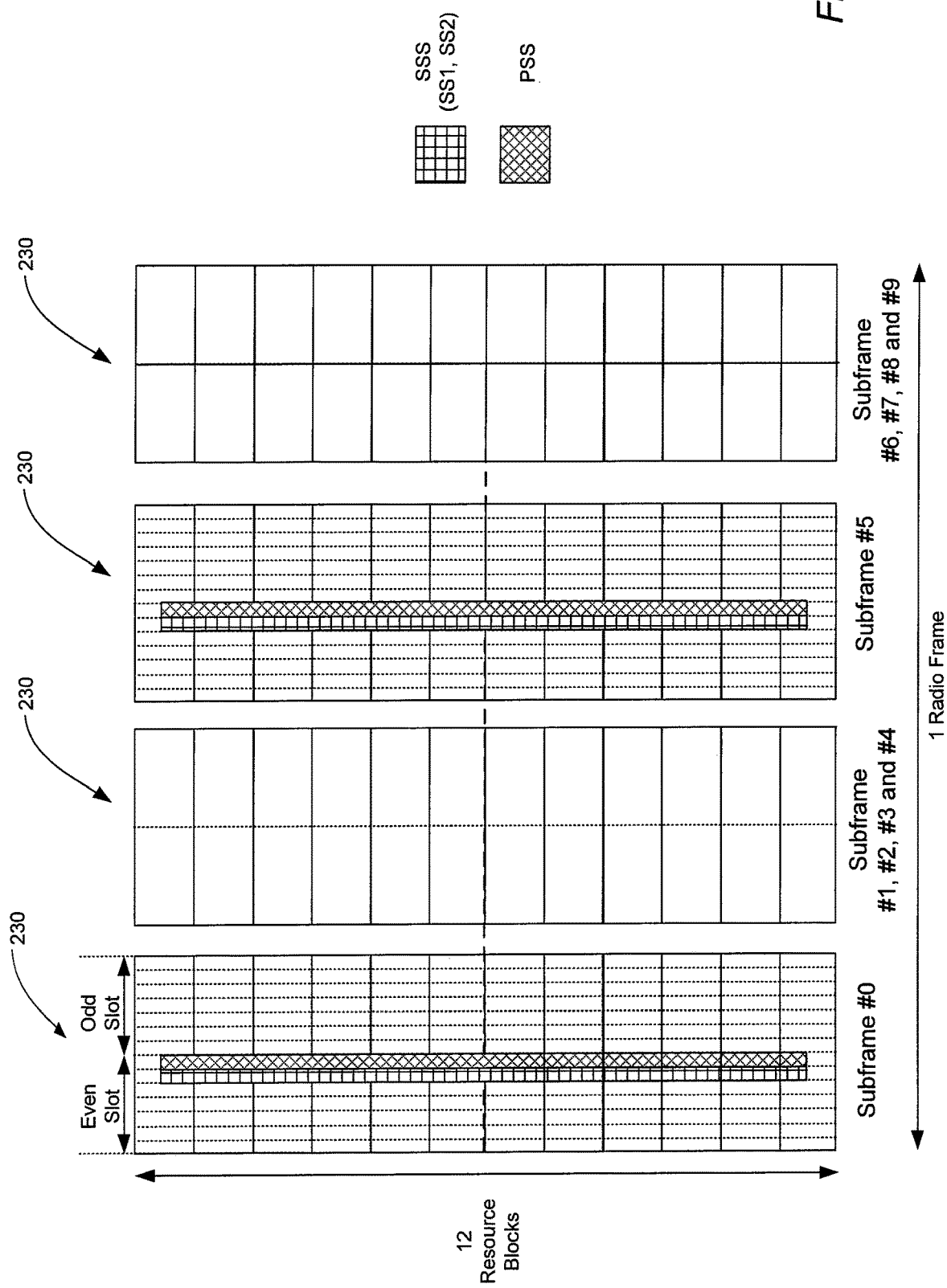
FIG. 15 shows an illustration of another example of how discovery signals may be transmitted in a small cell of the telecommunication system of FIG. 1.

FIGS. 14 and 15 each illustrate an exemplary radio frame, transmitted by a small cell base station 6, in which the discovery signal is enhanced in the frequency domain. In the example of FIG. 14, the primary synchronisation signal (PSS) is enhanced by transmitting it over 12 resource blocks rather than 6 resource blocks. The central 6 resource blocks in this case correspond to the legacy PSS (for example for use in identifying the Cell ID).

In the example of FIG. 15, both the primary synchronisation signal (PSS) and the secondary synchronisation signal (SSS) are enhanced by transmitting each over 12 resource blocks rather than 6 resource blocks. Like the example of FIG. 14, the central 6 resource blocks correspond to the respective legacy SSS and PSS (for example for use in identifying the Cell ID).

It will be appreciated that in all the above examples in which the discovery signal is enhanced in the frequency domain the enhancement beneficially allows time estimation and RSRP/RSRQ measurements to be carried out in addition to fast cell discovery.

Specifically, for time estimation, having a relatively large number of reference (synchronisation) signals/symbols in the frequency domain in the enhanced discovery signals allows time estimation to be performed using the discovery signals instead of using, cell specific reference signals (CRS).

Regarding measurement, the additional reference signals (comprising synchronisation signals/other dedicated signals) in the discovery signals in the frequency domain allows such measurements to be performed more efficiently and reliably.

Figure 16:
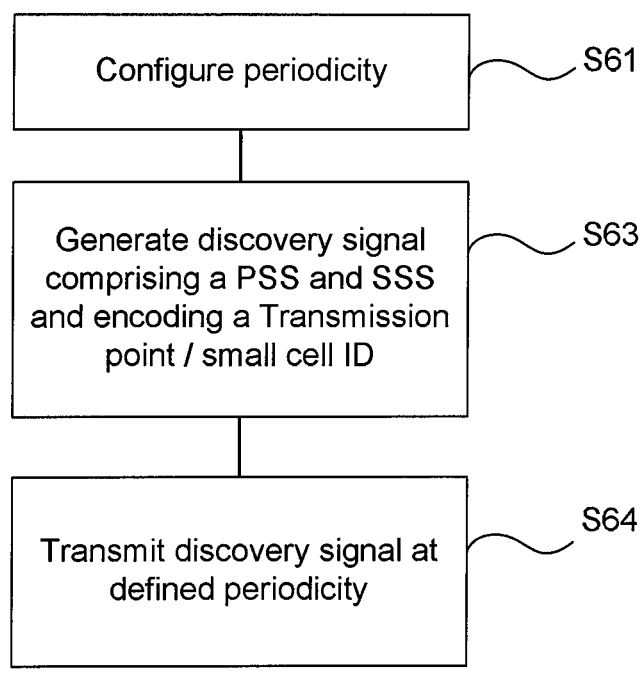
FIG. 16 shows a flow chart illustrating, in simplified form, one method by which a small cell base station of FIG. 1 may generate and transmit a discovery signal for discovery by the mobile communication device in a cell search procedure for cell discovery purposes.

FIG. 16 shows a flow chart illustrating one method by which a small cell base station 6 may generate and transmit a discovery signal for discovery by the mobile communication device 3 in a cell search procedure for cell discovery purposes in the above exemplary embodiments.

Figure 17:
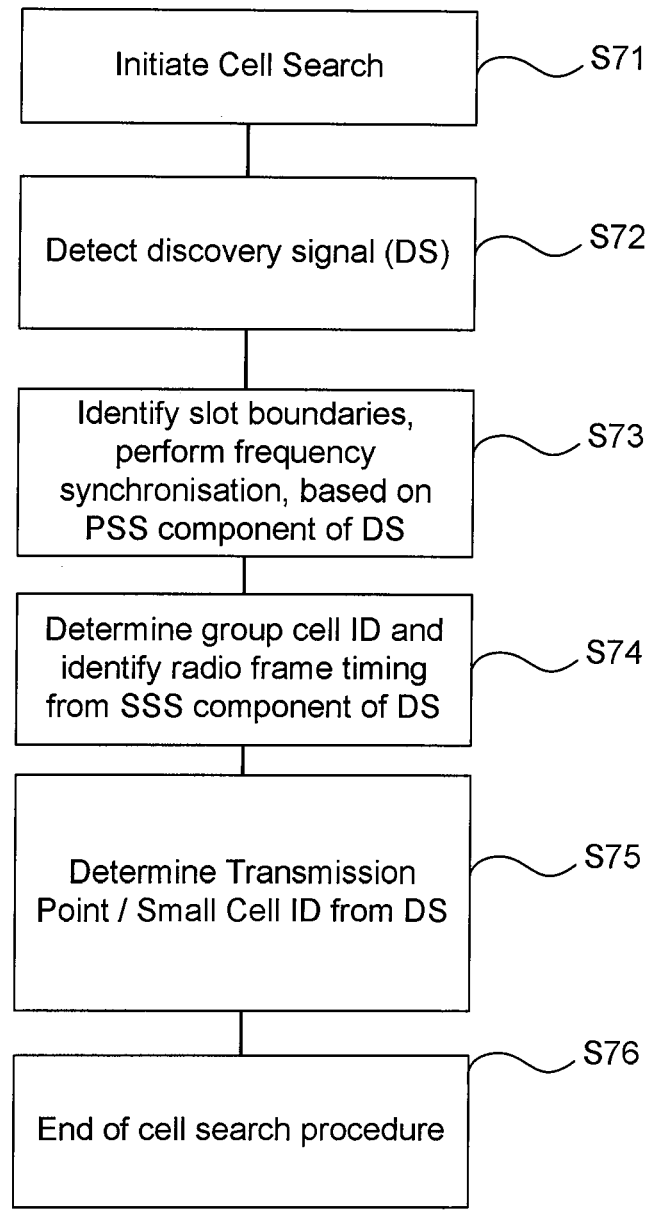
FIG. 17 shows a flow chart illustrating, in simplified form, one method by which a mobile communication device of FIG. 1 may use the discovery signal in a cell search procedure for cell discovery purposes.

FIG. 17 shows a flow chart illustrating one method by which a mobile communication device 3 may use the discovery signal in a cell search procedure for cell discovery purposes in the above exemplary embodiments.

Figure 18:
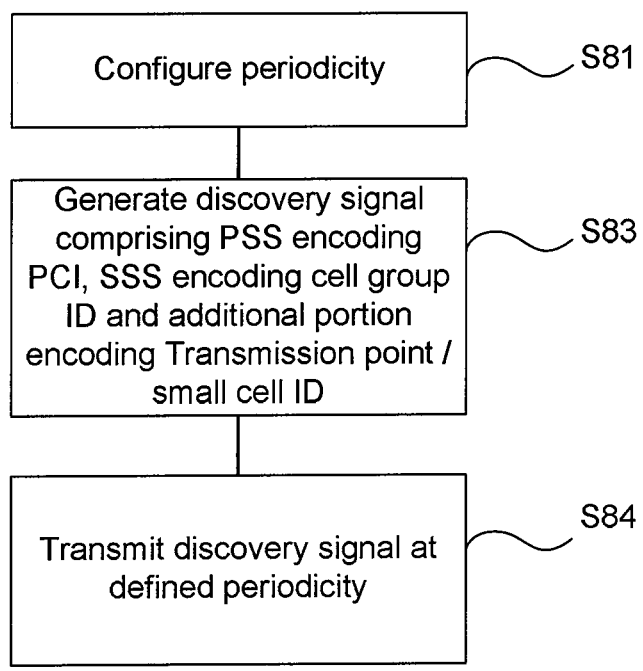
FIG. 18 shows a flow chart illustrating, in simplified form, another method by which a small cell base station of FIG. 1 may generate and transmit a discovery signal for discovery by the mobile communication device in a cell search procedure for cell discovery purposes.

FIG. 18 shows a flow chart illustrating another, more detailed, method by which a small cell base station 6 may generate and transmit a discovery signal for discovery by the mobile communication device 3 in a cell search procedure for cell discovery purposes. The flow chart is particularly relevant to the examples of FIGS. 12 and 13 where Cell ID and small cell ID/TP ID are encoded separately.

Figure 19:
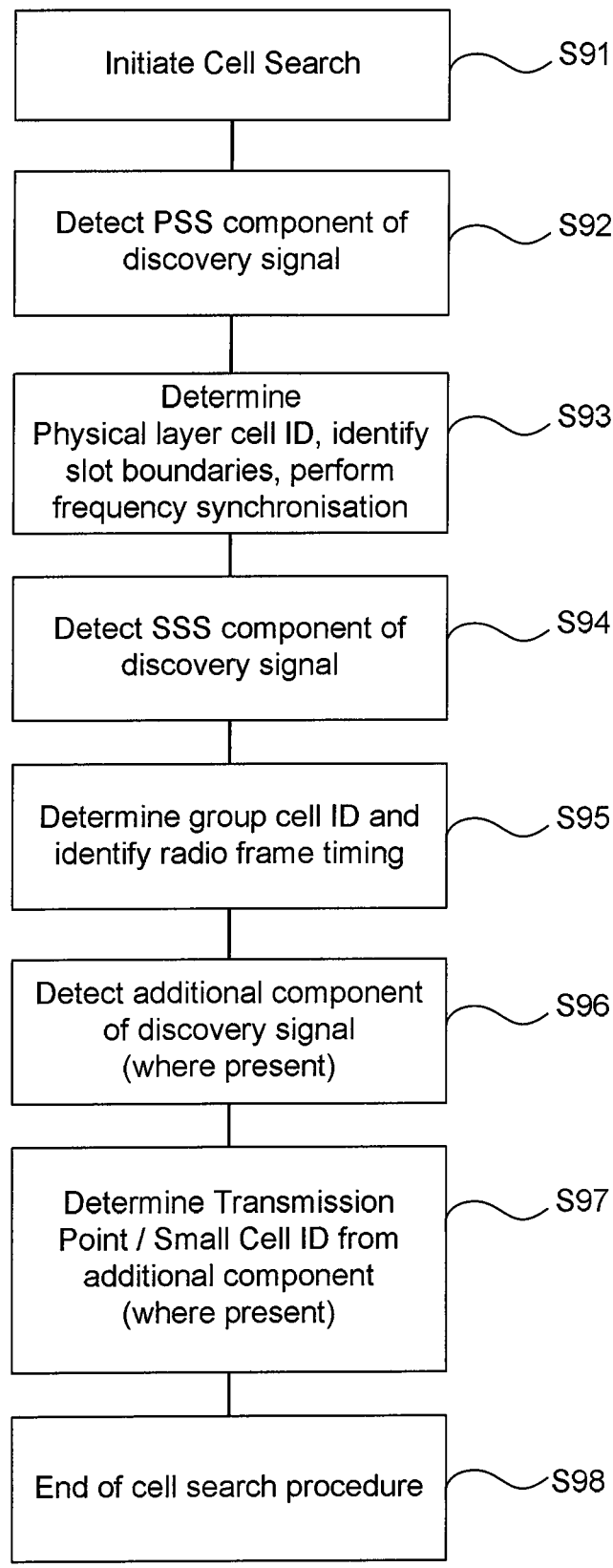
FIG. 19 shows a flow chart illustrating, in simplified form, another method by which a mobile communication device of FIG. 1 may use the discovery signal in a cell search procedure for cell discovery purposes.

FIG. 19 shows a flow chart illustrating another, more detailed, method by which a mobile communication device 3 may use the discovery signal in a cell search procedure for cell discovery purposes. The flow chart is particularly relevant to the examples of FIGS. 12 and 13 where Cell ID and small cell ID/TP ID are encoded separately.

Modifications, Alternatives and Further Information

Detailed exemplary embodiments have been described above in which unique structures of proposed discovery signals are described and, in particular, the proposed discovery signals of one radio frame can be repeated with a configurable periodicity, e.g., 200, 500, or 1000 subframes/radio frames. As those skilled in the art will appreciate, a number of modifications and alternatives can be made to the above embodiment and variations whilst still benefiting from the inventions embodied therein.

It will be appreciated that whilst relatively complex discovery signals have been described that provide additional benefits in terms of the ability to perform frequency and/or timing estimation and measurements without the additional signalling required in current communication systems. If such additional benefits are not required then the additional signalling overhead can be significantly reduced by transmitting a discovery signal, at the configured periodicity, comprising just one pair of PSS and SSS (e.g. not including the PCC/SSS2 typically sent in the sixth subframe). This is particularly advantageous where some level of synchronisation with the macro cell is available (e.g. where the macro cell is a primary cell (PCell) and the small cell is an associated secondary cell (SCell), and so macro cell can control/synchronise the transmission timing of the small cell).

In each example, the discovery signal can carry the current Cell ID or a different ID such as a dedicated transmission point ID ('TP ID') or 'small cell ID' which can be used to distinguish different small cells within a small cell cluster having the the same Cell ID. For example, in case of same Cell ID for all small cells within a cluster, the macro cell can allocate a different ID to each small cell within the cluster, and the mobile communication device can detect and report it to the macro cell which can then identify which small cell the mobile communication device has detected based on the reported ID.

It will be appreciated therefore that the proposed structures can beneficially provide more physical Cell IDs than the 504 of the current system by introducing new code sequences for the discovery signal (first and second parts).

It will be appreciated that in the above examples, the proposed structures do not depend on the size of the system bandwidth because the discovery signals are located in the central 6 or 12 RBs. The proposed structures beneficially provide backward compatibility for legacy mobile communication devices by keeping the existing PSS and SSS in the central 6 RBs.

It will also be appreciated that whilst the legacy PSS/SSS configuration has been retained in the small cell discovery signal examples described above this need not be the case. A dedicated small cell PSS/SSS configuration could be defined having any suitable PSS/SSS configuration, for example, a configuration in which the SSS and PSS were reversed.

In the examples of FIGS. 12 and 13 in particular, as described above, the PCI/cell group ID may be used to represent a small cell 'Cluster ID' (e.g. which is equivalent to a Cell ID that is shared by the plurality of cells in the cluster) and may thus be transmitted on the existing PSS/SSS. A dedicated transmission point ID ('TP ID') or 'small cell ID' within the cluster may then be transmitted using the second part of the discovery signal. Therefore, a mobile communication device can detect a cluster ID first using only the legacy PSS/SSS signal and then can detect a TP ID within the cluster using the second part of the discovery signal. Alternatively or additionally, a single 'global TP ID' or 'global Cell ID' may be transmitted which the mobile communication device can detect in one step using all the transmitted discovery signals. This may, for example, be faster than the using separate a Cell ID/Cluster ID and TP ID/small cell ID, but the search complexity may be increased because there are more possible IDs to be searched.

Part or all of a discovery signal could be transmitted on a different carrier frequency from that of the legacy PSS/SSS, for example on the same carrier as the macro cell. This would allow mobile communication devices camped on the macro cell to search for small cells using intra-frequency search and measurements instead of inter-frequency search and measurements, thus reducing mobile communication device complexity.

As explained above, the proposed discovery signals need not be used only for cell search, but also for other purposes such as time/frequency estimation and RSRP/RSRQ measurements, thus reducing mobile communication device complexity as well as downlink reference signal transmission overhead.

It will be appreciated that the discovery signal can carry the status information of the detected cell, such as dormancy/cell load, e.g., by encoding cell dormancy (i.e., load zero)/cell load information together with appropriate identification information in the the second discovery signal part.

Similar signalling structures may also be applied to device to device (D2D) and machine type communications (MTC) in order to identify other devices or TP (transmission point)/RP (reception point) in Coordinated Multi-Point (CoMP) transmission/reception scenarios.

It will be appreciated that the separation of synchronisation signals in FIGS. 9, 10 and 12 need not be a whole slot but may comprise any appropriate number of symbols ranging from a few symbols to several symbols.

It will be appreciated that although the communication system 1 is described in terms of base stations 5 operating as macro or small cell base stations, the same principles may be applied to base stations operating as femto base stations, relay nodes/UE-Relays providing elements of base station functionality, or other such communication nodes.

In the above exemplary embodiments, a mobile telephone based telecommunications system was described. As those skilled in the art will appreciate, the signalling techniques described in the present application can be employed in other communications systems. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the exemplary embodiments described above, the base stations 5, 6 and mobile communication devices 3 each include transceiver circuitry. Typically, this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

The invention claimed is:

1. A method performed in a base station which communicates with a user equipment (UE), the method comprising:
transmitting, to the UE, a message which comprises an information element for configuring a periodicity of discovery signals to be a periodicity selected from a finite number of selectable periodicities, the information element for configuring the periodicity of the discovery signals being configurable to configure the periodicity to be any of at least three possible selectable periodicities, wherein each selectable periodicity corresponds to a respective integer multiple of 10 ms that is greater than 10 ms, wherein a shortest of the selectable periodicities is less than 100 ms, a second shortest of the selectable periodicities is twice the shortest periodicity, and a third shortest of the selectable periodicities is twice the second shortest periodicity; and
transmitting at least one discovery signal based on the periodicity;
wherein the at least one discovery signal comprises a primary synchronization signal, a secondary synchronization signal, and at least one signal for the UE to measure at least one of a Reference Signal Received Power (RSRP) and a Reference Signal Received Quality (RSRQ).

2. The method according to the claim 1, wherein the method further comprises receiving a measurement result based on the at least one signal for the UE to measure at least one of RSRP and RSRQ.

3. The method according to the claim 1, wherein the at least one discovery signal is transmitted in a duration within the periodicity.

4. A method performed by a user equipment (UE) which communicates with a base station, the method comprising:
receiving, from the base station, a message which comprises an information element for configuring a periodicity of discovery signals to be a periodicity selected from a finite number of selectable periodicities, the information element for configuring the periodicity of the discovery signals being configurable to configure the periodicity to be any of at least three possible selectable periodicities, wherein each selectable periodicity corresponds to at respective integer multiple of 10 ms that is greater than 10 ms, wherein a shortest of the selectable periodicities is less than 100 ms, a second shortest of the selectable periodicities is twice the shortest periodicity, and a third shortest of the selectable periodicities is twice the second shortest periodicity; and
receiving at least one discovery signal based on the periodicity,
wherein the at least one discovery signal comprises a primary synchronization signal, a secondary synchronization signal, and at least one signal for the UE to measure at least one of a Reference Signal Received Power (RSRP) and a Reference Signal Received Quality (RSRQ).

5. The method according to the claim 4, wherein the method further comprises transmitting a measurement result based on the at least one signal for the UE to measure at least one of RSRP and RSRQ.

6. The method according to the claim 4, wherein the at least one discovery signal is transmitted in a duration within the periodicity.

7. A base station which communicates with a user equipment (UE), the base station comprising:
a transceiver circuit configured to transmit, to the UE, a message which comprises an information element for configuring a periodicity of discovery signals to be a periodicity selected from a finite number of selectable periodicities, the information element for configuring the periodicity of the discovery signals being configurable to configure the periodicity to be any of at least three possible selectable periodicities, wherein each selectable periodicity corresponds to a respective integer multiple of 10 ms that is greater than 10 ms, wherein a shortest of the selectable periodicities is less than 100 ms, a second shortest of the selectable periodicities is twice the shortest periodicity, and a third shortest of the selectable periodicities is twice the second shortest periodicity;

wherein the transceiver circuit is further configure to transmit at least one discovery signal based on the periodicity, and wherein the at least one discovery signal comprises a primary synchronization signal, a secondary synchronization signal, and at least one signal for the UE to measure at least one of a Reference Signal Received Power (RSRP) and a Reference Signal Received Quality (RSRQ).

8. A user equipment (UE) which communicates with a base station, the UE comprising:

a transceiver circuit configured to receive, from the base station, a message which comprises an information element for configuring a periodicity of discovery signals to be a periodicity selected from a finite number of selectable periodicities, the information element for configuring the periodicity of the discovery signals being configured to configure the periodicity to be any of at least three possible selectable periodicities, wherein each selectable periodicity corresponds to a respective integer multiple of 10 ms that is greater than 10 ms, wherein a shortest of the selectable periodicities is less than 100 ms, a second shortest of the selectable periodicities is twice the shortest periodicity, and a third shortest of the selectable periodicities is twice the second shortest periodicity;

wherein the transceiver circuit is further configure to receive at least one discovery signal based on the periodicity, and wherein the at least one discovery signal comprises a primary synchronization signal, a secondary synchronization signal, and at least one signal for the UE to measure at least one of a Reference Signal Received Power (RSRP) and a Reference Signal Received Quality (RSRQ).

\* \* \* \* \*